(12) United States Patent
Carr

(10) Patent No.: US 9,160,079 B2
(45) Date of Patent: Oct. 13, 2015

(54) COMPACT MULTI-BAND ANTENNA

(71) Applicant: William N. Carr, Montclair, NJ (US)

(72) Inventor: William N. Carr, Montclair, NJ (US)

( * ) Notice: Subject to any disclaimer, the term of this patent is extended or adjusted under 35 U.S.C. 154(b) by 0 days.

(21) Appl. No.: 14/017,523

(22) Filed: Sep. 4, 2013

(65) Prior Publication Data

US 2014/0008446 A1   Jan. 9, 2014

Related U.S. Application Data

(63) Continuation-in-part of application No. 13/199,919, filed on Sep. 14, 2011, now Pat. No. 8,581,793.

(51) Int. Cl.
| | |
|---|---|
| *G06K 19/06* | (2006.01) |
| *H01Q 21/28* | (2006.01) |
| *H01Q 21/00* | (2006.01) |
| *G06K 19/077* | (2006.01) |
| *H01Q 1/24* | (2006.01) |
| *H01Q 1/36* | (2006.01) |
| *H01Q 9/28* | (2006.01) |
| *H01Q 1/48* | (2006.01) |
| *G06K 19/07* | (2006.01) |
| *H01Q 1/22* | (2006.01) |
| *H01Q 5/321* | (2015.01) |
| *H01Q 5/378* | (2015.01) |

(52) U.S. Cl.
CPC ............ *H01Q 21/28* (2013.01); *G06K 19/0724* (2013.01); *G06K 19/07783* (2013.01); *H01Q 1/2208* (2013.01); *H01Q 1/248* (2013.01); *H01Q 1/36* (2013.01); *H01Q 1/48* (2013.01); *H01Q 5/321* (2015.01); *H01Q 5/378* (2015.01); *H01Q 9/285* (2013.01); *H01Q 21/0087* (2013.01); *Y10T 29/49016* (2015.01)

(58) Field of Classification Search
CPC .................. G06K 19/07749; G06K 19/06187; G06K 19/06196
USPC ......................... 235/492, 493, 462.46, 472.02
See application file for complete search history.

(56) References Cited

U.S. PATENT DOCUMENTS

| | | | | |
|---|---|---|---|---|
| 5,510,769 | A  * | 4/1996 | Kajfez et al. ................ | 340/572.5 |
| 6,646,554 | B1 * | 11/2003 | Goff et al. .................... | 340/572.6 |
| 7,023,209 | B2 * | 4/2006 | Zhang et al. ................... | 324/318 |
| 8,219,143 | B2 * | 7/2012 | Waku et al. ................. | 455/552.1 |
| 8,484,601 | B2 * | 7/2013 | Reis et al. ....................... | 716/132 |
| 8,611,958 | B2 * | 12/2013 | Koyama et al. ............. | 455/562.1 |

* cited by examiner

*Primary Examiner* — Daniel St Cyr
(74) *Attorney, Agent, or Firm* — Kaplan Breyer Schwarz & Ottesen, LLP

(57) ABSTRACT

A multi-band antenna is disclosed that can operate in two different frequency bands through two different modes of operation. It can operate as a radio antenna for coupling energy into or out of a radio signal in a radio frequency band; or it can operate as a magnetic antenna for coupling energy into or out of a magnetic signal in a lower frequency band. A radio signal is a signal consisting of an electromagnetic wave; a magnetic signal is a signal consisting of a magnetic field. The multi-band antenna achieves the two modes of operation in a compact volume of space comparable to the volume of space occupied by an equivalent single-band antenna.

4 Claims, 15 Drawing Sheets

Monopole radio antenna 100 with metal sheet for ground plane

RFID device 200 with resonant radio antenna made out of a metal sheet

RFID device 300 with dipole antenna made out of two metal sheets

RFID device 400 with patch antenna made out of two metal sheets

RFID device 500 with asymmetric dipole antenna and ground plane, all made out of metal sheets RFID device 600 with folded dipole antenna made out of a metal sheet RFID device 700 with flat magnetic coil for antenna — top view Flat magnetic coil 800 — top view

Monopole antenna 900 with flat magnetic coil for ground plane

Flat magnetic coil with center patch 1000 — top view

Flat magnetic coil with slotted center patch 1100 — top view

Monopole antenna 1200 with flat magnetic coil and slotted center patch for ground plane Two-layer flat magnetic coil 1300 — top view Magnified view of 1360 detail of coil-layer overlap, shown in cross-section Two-layer flat magnetic coil 1600 — top view RFID device 1700 with dual-band antenna comprising a flat magnetic coil Resonant antenna 1800 with flat magnetic coil replacing part of the metal sheet Patch antenna 1900 with flat magnetic coil replacing both metal sheets RFID device 2000 with dual-band antenna comprising a flat magnetic coil Simplified circuit diagram for RFID device 2000

RFID device 2100 with triple-band antenna comprising a flat magnetic coil

Simplified circuit diagram for RFID device 2100

RFID device 2200 with dual-cavity radio antenna made out of a metal sheet

Dual-cavity antenna 2300 with flat magnetic coils replacing parts of the metal sheet

COMPACT MULTI-BAND ANTENNA

FIELD OF THE INVENTION

The present invention relates, in general, to antenna design for radio communications, and to magnetic-coil design for magnetically-coupled communications; more particularly, the present invention relates to antenna design and magnetic-coil design for Radio-Frequency IDentification (RFID) systems.

BACKGROUND OF THE INVENTION

Communication systems based on radio signals have existed for over a century. Radio signals are electromagnetic waves, and designers of antennas for such signals have generated a wide range of designs with the goal of achieving good performance in a variety of operating conditions. Similarly, communication systems based on magnetic coupling have existed for a long time. Signals used by such systems (hereinafter "magnetic signals") are magnetic fields. Antennas for magnetic signals are different from antennas for radio signals; however, the goal of achieving good performance in a variety of operating conditions is still important.

In both types of communication systems, the antenna couples energy into or out of the associated signal. Generally, an important goal for the antenna designer when designing, for example, a receiving antenna, is to maximize energy transfer between the signal incident on the antenna and the resulting electrical signal generated by the antenna. The higher the energy transfer, the higher the received signal-to-noise ratio will be, and this usually results in better receiver performance.

In many applications, small size is desirable. For example, RFID devices are usually very small. Some RFID devices use radio communications while others use magnetically-coupled communications. The two types of communications offer different advantages and disadvantages and, depending on the application, one or the other type of communications might be better.

In some applications, it is desirable to have a communication system that can implement both radio communications and magnetically-coupled communications, such that either type of communications can be used as needed. Such a communication system needs to have an antenna for radio signals (hereinafter "radio antenna") and an antenna for magnetic signals (hereinafter "magnetic antenna"). If small size is also desirable, the requirement of having both an efficient radio antenna and an efficient magnetic antenna makes it difficult to simultaneously achieve small size and good communication performance with both types of communications.

It is important to underscore the fundamental difference between radio communications and magnetically-coupled communications. A radio signal is an electromagnetic wave that propagates through air or vacuum. As such, it comprises both magnetic fields and electric fields and the interrelationship between the electric and magnetic fields is what enables an electromagnetic wave to propagate through air or vacuum. In particular, the time-varying electric fields in the electromagnetic wave generate time-varying magnetic fields, and the time-varying magnetic fields generate time-varying electric fields, and the sequence then repeats. This chain of intertwined electric and magnetic fields is what enables an electromagnetic wave to carry energy that can be collected by a receiving radio antenna at large distances.

In contrast to radio signals, magnetic signals in magnetically-coupled communications consist exclusively of magnetic fields. Electric fields do not play a role. Typically, there is a first magnetic antenna implemented as a magnetic coil that generates a time-varying magnetic field, and there is a second magnetic antenna also implemented as a magnetic coil that picks up part of that magnetic field. Magnetic fields carry energy and, therefore, energy is transferred from the first coil to the second coil; however, the ability to transfer energy goes only as far as the magnetic field can reach. Even though the time-varying nature of the magnetic fields used for magnetic communications means that some incidental time-varying electric fields are generated, such electric fields are weak and hold only a very small amount of energy that is not useful for communication.

Because magnetic fields become weaker with distance faster than electromagnetic waves, radio communications are generally more advantageous at comparatively longer distances, and magnetically-coupled communications are more advantageous at comparatively shorter distances. Operation of a wireless system at the longer distances is often referred to as "long range" operation, while operation at the shorter distances is often referred to as "proximity" operation.

Generally, magnetically-coupled communications utilize frequencies that are significantly lower than the frequencies utilized by radio communications. Cost and ease of implementation depend on frequency as well as on the type of communication used. In certain applications, it is desirable to communicate through multiple frequencies, with some frequencies used for radio communications and other frequencies used for magnetically-coupled communications. Systems for such applications require antennas that are efficient at multiple frequencies.

In this specification, unless otherwise indicated, the verb "To conduct" and its inflected and derived forms ("conductor", "conductive", "conductance", "conductivity", etc.) refers to electrical conduction.

FIG. 1 depicts monopole radio antenna 100 in accordance with the prior art. Monopole radio antenna 100 comprises monopole 110, ground plane 115, and transmission line 130 which connects monopole 110 to input-output port 140. Monopole radio antenna 100 is an example of a radio antenna that comprises a flat metal sheet; in particular, ground plane 115 is a flat metal sheet and monopole 110 is a metal rod that protrudes out of a small hole in the metal sheet. Monopole 110 is supported in the small hole by bushing 150, which is an electrical insulator. Monopole 110 is perpendicular to ground plane 115.

Efficient operation of monopole radio antenna 100 depends on the fact that ground plane 115 is a good conductor at the frequency of operation of the antenna. Ground plane 115 is made out of a metal, such as aluminum, brass or copper, that is known to be a good conductor at the frequency of operation of the antenna. Operational parameters of the antenna, such as impedance, radiation pattern, et cetera, are a function of the shape, size, and electrical properties of ground plane 115. It is well known in the art how to predict such antenna parameters based on the specific shape, size and electrical properties of ground plane 115. It is also well known in the art how to adjust the shape, size and electrical properties of ground plane 115 so as to achieve desired results for such parameters.

FIG. 2 depicts RFID device 200 in accordance with the prior art. RFID device 200 comprises antenna 210 and load element 220. Antenna 210 is a radio antenna made out of a metal sheet bent into the shape depicted in FIG. 2. That shape forms resonant structure 250 which is known in the art to provide good coupling with electromagnetic radio signals near a specific frequency of resonance. Load element 220 is connected to the metal sheet at connection points 230-1 and 230-2 which, together, make up input-output port 240, which is the single input-output port of antenna 210.

Load element 220 is an electrical circuit for processing electrical signals generated by the antenna, and for generating electrical signals to be fed to the antenna. In a typical application, RFID device 200 receives a first radio signal whose energy is converted into a first electrical signal generated by the antenna. The first electrical signal appears at input-output port 240 and is processed by load element 220, which, in response, generates a second electrical signal. Load element 220 feeds this second electrical signal into input-output port 240, and antenna 210 converts the energy of the second electrical signal into a transmitted radio signal.

In some applications, load element 220 might be a single integrated circuit; in other applications, it might be a more complex device comprising a plurality of electronic components. In all applications, the impedance that load element 220 presents at its two terminals is crucial for proper operation of RFID device 200. Generally, when load element 220 is operated as a receiver for processing the first electrical signal, it is desirable for it to present an impedance that approximates a good conjugate match for the impedance of resonant structure 250 at the frequency of operation of RFID device 200. Such an impedance achieves maximum power transfer from the antenna to load element 220. However, in other applications, a different impedance might be more advantageous. For example, in applications where the first electrical signal needs to be rectified by a diode, it is important to achieve a voltage high enough to drive the diode into forward conduction. In such applications, a larger impedance that achieves higher voltages might be advantageous even though it might not achieve maximum power transfer.

When load element 220 is operated as a transmitter for generating the second electrical signal, yet other impedance values might be desirable. For example, for so-called backscatter modulation, load element 220 might vary its impedance between two values that are both substantially different from a conjugate match at the frequency of operation of RFID device 200. The impedance that load element 220 presents at frequencies other than the frequency of operation of RFID device 200 is, of course, inconsequential.

Much like the monopole antenna of FIG. 1, efficient operation of antenna 210 depends on the fact that the metal sheet is a good conductor at the frequency of operation of the antenna. Also, here too, operational parameters of the antenna, such as impedance, radiation pattern, et cetera, are a function of the shape, size, and electrical properties of the metal sheet out of which antenna 210 is made. It is well known in the art how to predict such operational parameters of the antenna based on the specific shape, size and electrical properties of the metal sheet. It is also well known in the art how to adjust the shape, size and electrical properties of the metal sheet so as to achieve desired results for such parameters.

FIG. 3 depicts RFID device 300 in accordance with the prior art. RFID device 300 comprises a dipole antenna that comprises two arms, which are depicted in FIG. 3 as 310-1 and 310-2. Each of the two arms is a metal sheet. RFID device 300 also comprises support substrate 360 which supports the two arms of the dipole antenna. Support substrate 360 is made out of a dielectric material and provides mechanical support for the entire structure. The use of support substrate 360 makes it possible for arms 310-1 and 310-2 to be thin metal layers deposited on the substrate. The substrate might be part of a printed-circuit board, and the thin metal layers might be copper traces on the printed-circuit board. The entire RFID device 300 might be part of a larger circuit on a printed-circuit board.

RFID device 300 also comprises load element 320, which is connected to the dipole antenna through input-output port 340. Similar to FIG. 2, load element 320 is an electrical circuit for processing electrical signals generated by the antenna, and for generating electrical signals to be fed to the antenna. The comments that were made in conjunction with FIG. 2 regarding load element 220 also apply for load element 320.

Much like the antennas of FIGS. 1 and 2, efficient operation of the dipole antenna in FIG. 3 depends on the fact that the metal sheets are good conductors at the frequency of operation of the antenna. Operational parameters of the antenna, such as impedance, radiation pattern, et cetera, are a function of the shape, size, electrical, and dielectric properties of the metal sheets and of the substrate. It is well known in the art how to predict such operational parameters of the antenna based on the specific shape, size, electrical, and dielectric properties of the metal sheets and of the substrate. It is also well known in the art how to adjust the shape, size and electrical properties of the metal sheets and of the substrate so as to achieve desired results for such parameters.

FIG. 4 depicts RFID device 400 in accordance with the prior art. RFID device 400 comprises a patch antenna that comprises two metal sheets; In particular, the antenna comprises floating patch 410 and ground plane 415, which are both metal sheets. RFID device 400 also comprises load element 420, which is connected to the dipole antenna through input-output port 440. Similar to FIG. 2, load element 420 is an electrical circuit for processing electrical signals generated by the antenna, and for generating electrical signals to be fed to the antenna. The comments that were made in conjunction with FIG. 2 regarding load element 220 also apply for load element 420.

In FIG. 4, floating patch 410 is depicted as floating in space without any mechanical support. In practice, the space between floating patch 410 and ground plane 415 might be filled with a dielectric material which provides mechanical support and whose dielectric properties affect the operational parameters of the antenna.

Much like the antennas of FIGS. 1, 2, and 3, efficient operation of the patch antenna in FIG. 4 depends on the fact that the metal sheets are good conductors at the frequency of operation of the antenna. Operational parameters of the antenna, such as impedance, radiation pattern, et cetera, are a function of the shape, size, and electrical properties of the metal sheets, as well as of the properties of any dielectric material between the two sheets, if present. It is well known in the art how to predict such operational parameters of the antenna based on the specific shape, size, and electrical properties of the metal sheets, and of any dielectric material between the two sheets, if present. It is also well known in the art how to adjust the shape, size and electrical properties of the metal sheets, and of any dielectric material between the two sheets, if present, so as to achieve desired results for such parameters.

FIG. 5 depicts RFID device 500 in accordance with the prior art. RFID device 500 comprises an asymmetric dipole antenna that comprises two arms, which are depicted in FIG. 5 as 510-1 and 510-2. Each of the two arms is a metal sheet, and the two arms are of different size and shape. Also, they are not in the same plane.

RFID device 500 also comprises ground plane 515 which is also a metal sheet and is parallel to arms 510-1 and 510-2. RFID 500 also comprises load element 520, which is connected to the asymmetric dipole antenna through input-output port 540. Similar to FIG. 2, load element 520 is an electrical circuit for processing electrical signals generated by the antenna, and for generating electrical signals to be fed to the antenna. The comments that were made in conjunction with FIG. 2 regarding load element 220 also apply for load element 520.

Much like the antennas of FIGS. 1, 2, 3, and 4, efficient operation of the asymmetric dipole antenna in FIG. 5 depends on the fact that the metal sheets are good conductors at the frequency of operation of the antenna. Operational parameters of the antenna, such as impedance, radiation pattern, et cetera, are a function of the shape, size, and electrical properties of all the metal sheets, including the ground plane. It is well known in the art how to predict such operational parameters of the antenna based on the specific shape, size, and electrical properties of all the metal sheets, including the ground plane. It is also well known in the art how to adjust the shape, size and electrical properties of the metal sheets so as to achieve desired results for such parameters.

FIG. 6 depicts RFID device 600 in accordance with the prior art. RFID device 600 comprises a so-called folded dipole antenna, which is depicted in FIG. 6 as folded dipole antenna 610, and is made out of a metal sheet cut in the shape depicted in the Figure.

RFID device 600 also comprises load element 620, which is connected to the folded dipole antenna through input-output port 640. Similar to FIG. 2, load element 620 is an electrical circuit for processing electrical signals generated by the antenna, and for generating electrical signals to be fed to the antenna. The comments that were made in conjunction with FIG. 2 regarding load element 220 also apply for load element 620.

Much like the antennas of FIGS. 1-5, efficient operation of the folded dipole antenna in FIG. 6 depends on the fact that the metal sheet is a good conductor at the frequency of operation of the antenna. Operational parameters of the antenna, such as impedance, radiation pattern, et cetera, are a function of the shape, size, and electrical properties of the metal sheet. It is well known in the art how to predict such operational parameters of the antenna based on the specific shape, size, and electrical properties of the metal sheet. It is also well known in the art how to adjust the shape, size and electrical properties of the metal sheet so as to achieve desired results for such parameters.

FIG. 7 depicts RFID device 700 in accordance with the prior art. Unlike the RFID devices of FIGS. 1-6, RFID device 700 uses magnetically-coupled communications instead of radio communications. Accordingly, instead of a radio antenna, RFID device 700 comprises a magnetic antenna implemented as flat magnetic coil 710.

RFID device 700 also comprises support substrate 760 which is a thin sheet of dielectric material that provides mechanical support for the entire structure. Flat magnetic coil 710 comprises a plurality of loops of conductive material connected in series; they are depicted in FIG. 7 as conductive loops 750. The loops of flat magnetic coil 710 are typically made out of a thin strip or ribbon of metal deposited on or otherwise attached to support substrate 760. RFID device 700 has a planar structure, and FIG. 7 shows a view from outside the plane looking in a direction perpendicular to the plane.

RFID device 700 also comprises load element 720, which is connected to flat magnetic coil 710 through input-output port 740. Similar to FIG. 2, load element 720 is an electrical circuit for processing electrical signals generated by flat magnetic coil 710, and for generating electrical signals to be fed to flat magnetic coil 710. The comments that were made in conjunction with FIG. 2 regarding load element 220 also apply for load element 720, except that, in this case, the magnetic antenna implemented as flat magnetic coil 710 couples with magnetic signals instead of radio signals.

The loops of flat magnetic coil 710 are all in the same plane, and they are electrically insulated form one another because support substrate 760 is made out of a dielectric material, which is a good electrical insulator. However, input-output port 740 needs to provide a connection to both ends of the coil, and, therefore, the open end of the outermost loop must cross over all the other loops to come near the open end of the innermost loop, where input-output port 740 is located. This is accomplished by insulated crossover 770, which is a thin strip or ribbon of metal that is attached to the end of the outermost loop and crosses over all the other loops to connect to input-output port 740. Though not explicitly shown in FIG. 7, there is a layer of electrically-insulating material between insulated crossover 770 and conductive loops 750 in the area where they overlap. This layer of insulating material insures that the loops of flat magnetic coil 710 remain electrically insulated from one another.

Efficient operation of the magnetic antenna of RFID device 700, which is implemented as flat magnetic coil 710, depends on the fact that conductive loops 750 are made out of a good conductor. The operational parameters of flat magnetic coils 710, when used as a magnetic antenna, are a function of the shape, size, and electrical properties of flat magnetic coil 170. In particular, they are a function of the number of loops and of the size and shape of the area enclosed by the loops. Generally, it is desirable to have as many loops as possible that span as large an area as possible. It is well known in the art how to predict operational parameters of a magnetic antenna implemented as magnetic coil based on the specific shape, size, number of loops and electrical properties of the magnetic coil. It is also well known in the art how to adjust the shape, size, number of loops and electrical properties of the magnetic coil so as to achieve desired results for such parameters.

FIG. 8 depicts flat magnetic coil 800, which is a simplified representation of flat magnetic coil 710. This representation highlights the fact that the conductive loops, shown in the Figure as conductive loops 850, are strips or ribbons of metal that are, typically, wider than the gaps between adjacent loops. This simplified representation does not explicitly show an input-output port or an insulated crossover; however, it should be understood that such elements are typically necessary and might be present wherever a flat magnetic coil is used. These and other elements, such as a load element, necessary in practical devices that use flat magnetic coils are not explicitly shown in this simplified representation but should be understood to be present as needed. Such a simplified representation of a flat magnetic coil is used in the figures of this specification to show the presence of a flat magnetic coil, with the understanding that other elements not explicitly shown might be present, as necessary, to achieve efficient operation of the flat magnetic coil as part of a magnetic antenna.

SUMMARY OF THE INVENTION

While many electrical components have been significantly miniaturized in recent years, reducing the size of antennas is difficult. This is true for both radio antennas and magnetic antennas. There are applications where it is advantageous to have both radio communications and magnetically-coupled communications. Devices for such applications need, therefore, to have both a radio antenna and a magnetic antenna. In the case of RFID devices, small size is usually desired. If such devices need to have both a radio antenna and a magnetic antenna, with each antenna occupying a different region of space, both antennas have to be small, leading to impaired antenna performance.

Embodiments of the present invention provide a dual-band antenna that can operate both as a radio antenna and as a magnetic antenna. The size of the antenna is the same as for an equivalent radio-only antenna or an equivalent magnetic-only antenna. In other words, two antennas, one for radio signals and one for magnetic signals, are merged into a single antenna without requiring separate portions of the available space.

The present invention is based on the observation that a flat magnetic coil can behave as a solid metal sheet at a high-enough frequency, if enough capacitive coupling exists between adjacent loops. Some embodiments of the present invention use techniques that enhance such capacitive coupling.

Some embodiments of the present invention are based on designs for radio antennas made out of metal sheets. In such designs, one or more of the metal sheets are replaced by flat magnetic coils. If there is enough capacitance between adjacent loops in such magnetic coils, they will behave like metal sheets at the frequency of operation of the radio antennas. The resulting antenna designs provide radio antennas with performance similar to the original designs, and the flat magnetic coils are effective as magnetic antennas.

BRIEF DESCRIPTION OF THE DRAWINGS

FIG. 7 shows a view from outside the plane looking in a direction perpendicular to the plane.

FIG. 21b shows a simplified circuit diagram for the RFID device of FIG. 21a.

DETAILED DESCRIPTION

Figure 1:
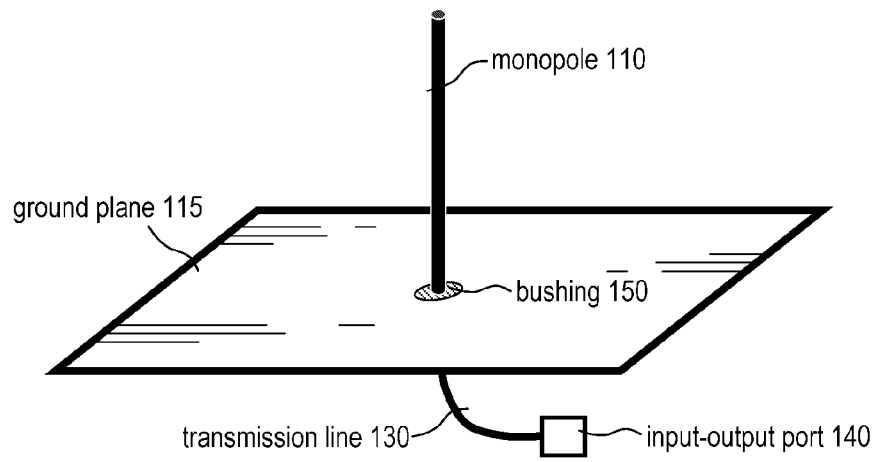
FIG. 1 depicts a monopole radio antenna with a metal sheet for ground plane in the prior art.
Figure 2:
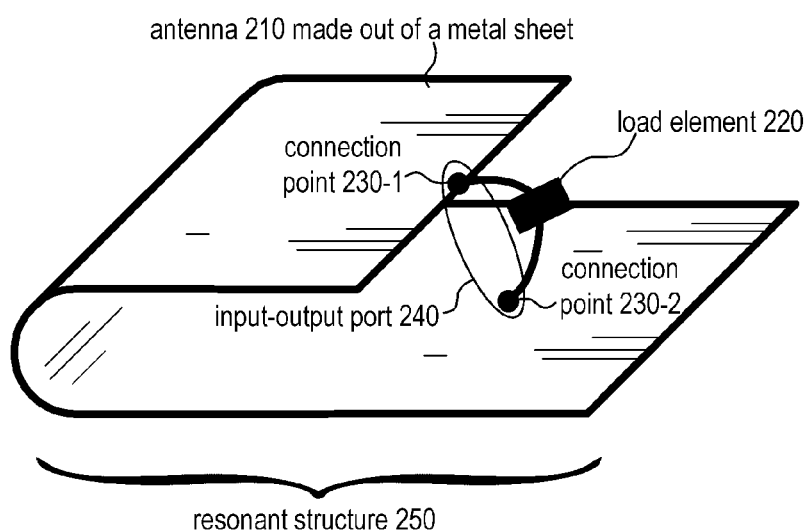
FIG. 2 depicts an RFID device with a resonant radio antenna made out of a metal sheet in the prior art.
Figure 3:
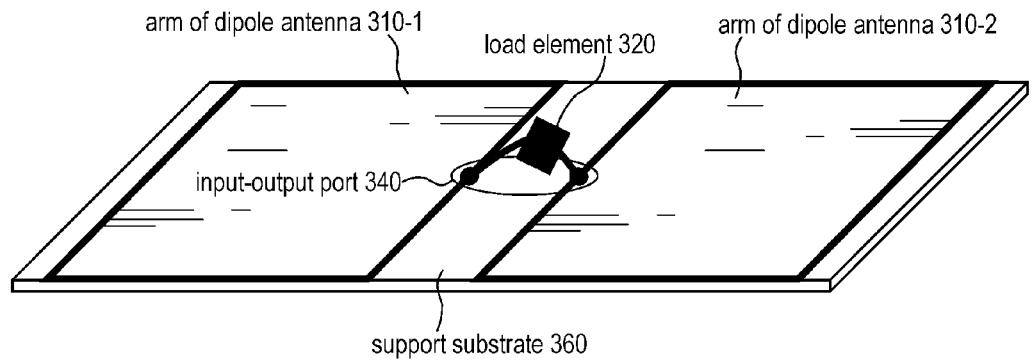
FIG. 3 depicts an RFID device with a dipole antenna made out of two metal sheets in the prior art.

While many electrical components have been significantly miniaturized in recent years, reducing the size of antennas is difficult. This is true for both radio antennas and magnetic antennas. For radio antennas, it is difficult to achieve a size much less than about one quarter of the wavelength of the radio signal. For magnetic antennas, the size of the antenna is directly related to the amount of magnetic energy that is coupled with the antenna, such that a smaller antenna collects less energy.

There are applications where it is advantageous to have both radio communications and magnetically-coupled communications. Devices for such applications need, therefore, to have both a radio antenna and a magnetic antenna. In many cases, the amount of space available for antennas is limited. This is often true for RFID devices, wherein small size is usually desired. If the limited space is to be divided between a radio antenna and a magnetic antenna, it is difficult to give both antennas enough space to achieve good antenna efficiency. If a device needs to operate in more than one radio band and/or in more than one magnetically-coupled communications band, the problem can be significantly exacerbated.

Embodiments of the present invention provide a dual-band antenna that can operate both as a radio antenna and as a magnetic antenna. The size of the antenna is the same as for an equivalent radio-only antenna or an equivalent magnetic-only antenna. In other words, two antennas, one for radio signals and one for magnetic signals, are merged into a single antenna without requiring separate portions of the available space.

Such an antenna is referred to as a "dual-band antenna" because, in most such embodiments, the frequency of operation of the antenna as a radio antenna is different from the frequency of operation of the antenna as a magnetic antenna. Generally, radio operation is in a higher-frequency band, compared to magnetic operation.

The present invention is based the following observations:
  i. Many useful radio antennas can be made out of metal sheets.

ii. The property of metal sheets that makes them effective as a building block for radio antennas is their electrical conductivity.

iii. A metal sheet behaves as an uninterrupted sheet of conductive material over its entire surface.

iv. Proper operation of a radio antenna relies on such behavior at the frequency of operation of the radio antenna, but it does not matter if a metal sheet does not exhibit such behavior at other frequencies.

v. Many useful magnetic antennas can be made out of flat magnetic coils.

vi. Such flat magnetic coils must behave as magnetic coils at the frequency of operation of the magnetic antenna, but it does not mater if they do not exhibit such behavior at other frequencies.

vii. A magnetic coil comprises a plurality of loops connected in series. Those loops must be electrically insulated form one another, but, unavoidably, some parasitic capacitance exists between adjacent loops.

viii. At a sufficiently high frequency, a capacitance behaves as an electrical short.

ix. Therefore, at a sufficiently high frequency, the capacitance between adjacent loops of a flat magnetic coil causes the loops to be, effectively, electrically connected to one another and the coil behaves as an uninterrupted sheet of conductive material.

In many devices that utilize both radio communications and magnetically-coupled communications, the frequencies used by magnetically-coupled communications are much lower than the frequencies used by radio communications. At the lower frequencies, the capacitance present between adjacent loops in a flat magnetic coil does not cause a significant impairment to the operation of the coil. However, at the higher frequencies of radio communications, the capacitance might be large enough to have such low impedance at those frequencies to effectively provide an electrical connection between adjacent loops. When that happens, the area of the flat magnetic coil that is covered by the loops behaves as if the gaps between loops were not present; i.e., it behaves as an uninterrupted sheet of conductive material.

Some embodiments of the present invention are based on designs for radio antennas made out of metal sheets, such as, for example, the designs depicted in FIGS. 1-6. In such designs, one or more of the metal sheets are replaced by flat magnetic coils. Coil designs are chosen wherein there is enough capacitance between adjacent loops such that, at the frequencies of operation of the radio antennas, the capacitance behaves as an electrical short. At those frequencies, the flat magnetic coils behave as uninterrupted sheets of conductive material; i.e., they behave as metal sheets. Therefore, antennas in accordance with embodiments of the present invention, when used at radio frequencies, behave much like the radio antennas made out of metal sheets on which their design is based.

Even if the behavior of a flat magnetic coil is not exactly identical to the behavior of a flat metal sheet at a particular radio frequency, it is well known in the art how to model the behavior of a radio antenna as a function of the electrical properties of the metal sheets of which it is made. As long as the flat magnetic coil approximates the behavior of a flat metal sheet at a desired radio frequency of operation, it will be clear to those skilled in the art, after reading this disclosure, how to make and use embodiments of the present invention that comprise flat magnetic coils whose behavior is not exactly identical to the behavior of a flat metal sheet at that radio frequency.

Although the present invention is often presented, in this specification, as it applies to radio communications and magnetically-coupled communications, it will be clear to those skilled in the art, after reading this disclosure, that the signals associated with such communications can be used for purposes other than communications. For example and without limitation, either radio signals or magnetic fields or both can be used for applications such as sensing, probing material characteristics, position determination, and presence detection, to name just a few. Additionally, energy coupled with an antenna can be used for power supply, a technique known in the art as "energy scavenging". This is true for both radio antennas and magnetic antennas. In some cases this is the only use of such coupled energy; in other cases, some of the coupled energy might also be used for other purposes. For example, passive RFID devices use received signals for both communications and for power supply. Antennas for such applications and others are subject to the similar constraints and requirements as for communications applications. Therefore, it will be clear to those skilled in the art, after reading this disclosure, how to make and use embodiments of the present invention for uses other than communications.

Although the present invention is often presented, in this specification, as it applies to RFID devices, it will be clear to those skilled in the art that there are other types of devices that use both magnetic antennas and radio antennas. It will be clear to those skilled in the art, after reading this disclosure, how to make and use embodiments of the present invention in conjunction with such other devices to achieve a reduction in the space required for antennas. For example and without limitation, a radio communication device that uses magnetic coupling for recharging a battery can use an embodiment of the present invention wherein the radio antenna is combined with the magnetic coil used for battery charging into a device in accordance with the present invention. It will be understood that the expression "magnetic antenna", as used in this specification, also refers to magnetic coils used in applications wherein such coils are not commonly referred to as "antennas".

Figure 9:
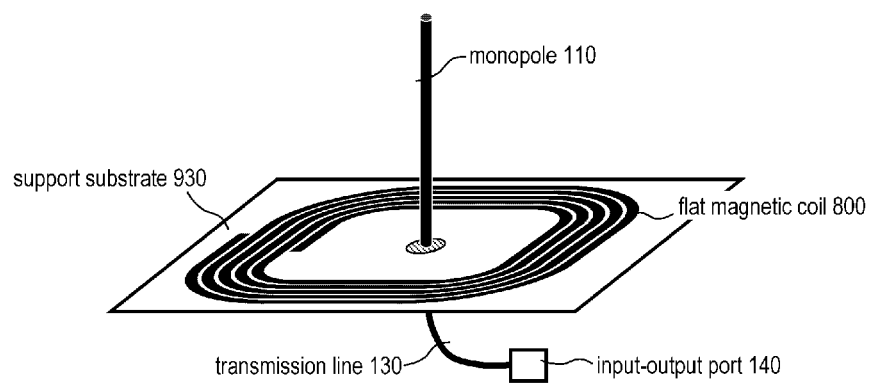
FIG. 9 depicts a monopole antenna with a flat magnetic coil for ground plane in accordance with an alternative embodiment of the present invention.

FIG. 9 depicts monopole antenna 900 in accordance with an alternative embodiment of the present invention. Monopole antenna 900 comprises monopole 110, and transmission line 130 which connects monopole 110 to input-output port 140. Monopole 110, transmission line 130, and input-output port 140 are identical to the elements by the same name shown in FIG. 1. Monopole radio antenna 900 also comprises support substrate 930 and flat magnetic coil 800 which, together, perform the same function as ground plane 115 when antenna 900 is operated as a radio antenna. In particular, support substrate 930 is made of dielectric material and provides mechanical support for monopole 110 and transmission line 130 in a manner similar to ground plane 115; flat magnetic coil 800 behaves as a metal sheet at the radio frequency of operation of the antenna, much like ground plane 115 in FIG. 1. In some embodiments of the present invention there is an electrical connection between one conductor of transmission line 130 and flat magnetic coil 800, as needed, to help flat magnetic coil 800 behave like ground plane 115.

When antenna 900 is operated as a magnetic antenna, the presence of monopole 110 and transmission line 130 might cause some disruptions to the magnetic field with which flat magnetic coil 800 is intended to couple. However, it will be clear to those skilled in the art, after reading this disclosure, how to make and use embodiments of monopole antenna 900 wherein such disruption of the magnetic field is acceptable, such that flat magnetic coil 800 is efficiently coupled with the energy of the magnetic field.

Although not explicitly shown in FIG. 9, embodiments of monopole antenna 900 might comprise one or more load elements for processing signals captured as radio signals or magnetic signals or both.

Figure 8:
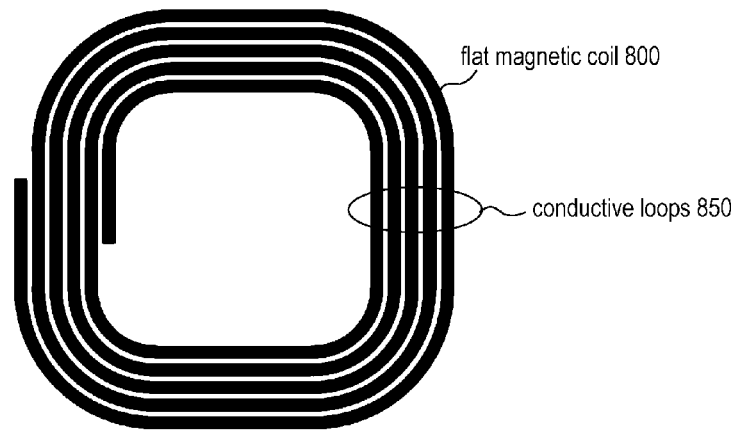
FIG. 8 depicts a simplified representation of a flat magnetic coil.

Although the capacitance that is present between adjacent loops of flat magnetic coil 800 enables it to behave as an uninterrupted metal sheet at the radio frequency of operation, such behavior might be impaired by the presence, in the middle of the coil, of an area where there are no loops. Such an area is clearly visible in FIG. 8. In some embodiments of the present invention, such impairment might be excessive, and FIG. 10 illustrates alternative embodiments of the present invention wherein such impairment is reduced.

Figure 10:
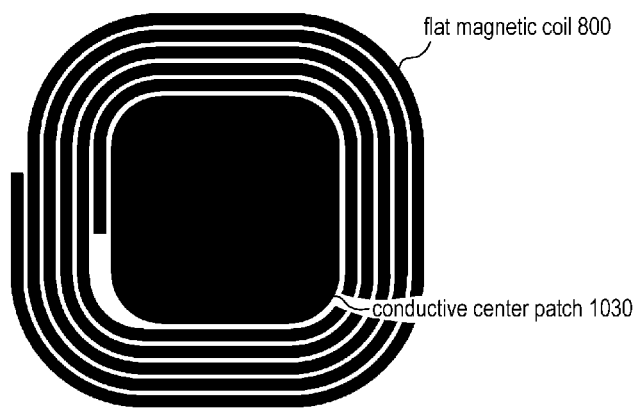
FIG. 10 depicts a flat magnetic coil with a center patch, as might be used in embodiments of the present invention.

FIG. 10 depicts flat magnetic coil with center patch 1000 as might be used in embodiments of the present invention wherein the impairment mentioned in the previous paragraph would, otherwise, be excessive. Flat magnetic coil with center patch 1000 comprises a flat magnetic coil identical to flat magnetic coil 800, and a patch of conductive material, depicted as conductive center patch 1030, that fills most of the area in the middle of the coil where there are no loops. Conductive center patch 1030 might be, for example, made of the same material of which the loops of flat magnetic coil 800 are made, and might be deposited on the same substrate, not shown in the figure, as the substrate that supports the loops of magnetic coil 800. It will be clear to those skilled in the art, after reading this disclosure, how to make and use embodiments of flat magnetic coil with center patch 1000.

The edge of conductive center patch 1030 is near the innermost loop of flat magnetic coil 800; therefore, there is some capacitance between the center patch and the loop. At a sufficiently high frequency, that capacitance causes the center patch to be, effectively, electrically connected to the innermost loop, such that coil 1000 behaves as an uninterrupted sheet of conductive material without the impairment caused by an area where there are no loops.

Although conductive center patch 1030 improves the ability of a flat magnetic coil to behave as an uninterrupted sheet of conductive material, it also has the potential of impairing its operation as a magnetic coil. This is because the area in the middle of the coil where there are no loops is also the area where the magnetic field provides much of the flux that is necessary for the coil to operate as a magnetic coil. The presence of conductive material in that area can lead to the formation of eddy currents which can reduce the magnetic flux.

Figure 11:
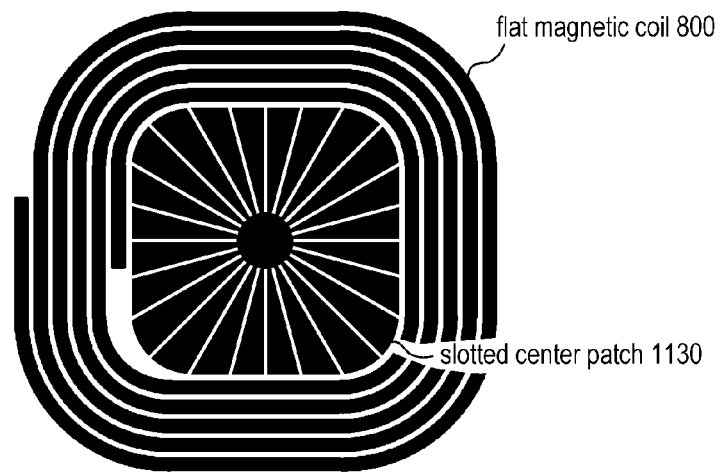
FIG. 11 depicts a flat magnetic coil with a slotted center patch, as might be used in embodiments of the present invention.

FIG. 11 depicts flat magnetic coil with slotted center patch 1100 as might be used in embodiments of the present invention wherein the impairment mentioned in the previous paragraph is excessive. Flat magnetic coil with slotted center patch 1100 comprises a flat magnetic coil identical to flat magnetic coil 800, and a patch of conductive material, depicted as slotted center patch 1130, that fills most of the area in the middle of the coil where there are no loops. Slotted center patch 1130 might be, for example, made of the same material of which the loops of flat magnetic coil 800 are made, and might be deposited on the same substrate, not shown in the figure, as the substrate that supports the loops of magnetic coil 800. In contrast to conductive center patch 1030, slotted center patch 1130 has slots wherein no conductive material is present. In FIG. 11, such slots are depicted as thin white lines emanating from near the center of the patch.

In slotted center patch 1130, the slots are thin areas without conductive material. Electric currents cannot flow in such areas, and this property makes it difficult for eddy currents to form. However, there will be capacitance across slots, much like the capacitance present across the gaps between adjacent coil loops. At a sufficiently high frequency, this capacitance allows electric currents to flow across the slots, much like capacitance present across the gaps between adjacent coil loops does. Therefore, at a sufficiently high frequency, the slotted center patch behaves as an uninterrupted conductive sheet, much like conductive center patch 1030, but at lower frequencies it does not reduce the magnetic flux as much as conductive center patch 1030.

Although FIG. 11 depicts the slots in slotted center patch 1130 as thin white lines emanating from the center of the patch, other patterns of slots are also possible. For example, and without limitation, a pattern of slots that form a rectangular grid would also work. In general, any pattern of slots wherein there is sufficient capacitance across slots will behave as an uninterrupted conductive sheet at higher frequencies. The effectiveness of slots at reducing eddy currents improves as the number and lengths of slots increases. It will be clear to those skilled in the art, after reading this disclosure, how to make and use embodiments of flat magnetic coil with slotted center patch 1100 with a pattern of slots that achieves the desired behavior.

Figure 12:
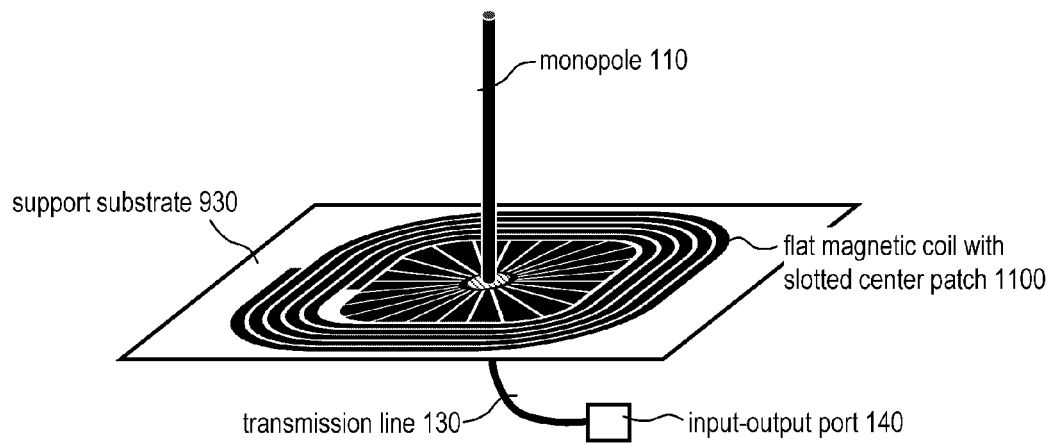
FIG. 12 depicts a monopole antenna with a flat magnetic coil and a slotted center patch for ground plane in accordance with an alternative embodiment of the present invention.

FIG. 12 depicts monopole antenna 1200 in accordance with an alternative embodiment of the present invention. Monopole antenna 1200 comprises monopole 110, and transmission line 130 which connects monopole 110 to input-output port 140. Monopole 110, transmission line 130, and input-output port 140 are identical to the elements by the same name shown in FIG. 1. Monopole radio antenna 1200 also comprises support substrate 930 and flat magnetic coil with slotted center patch 1100 which, together, perform the same function as ground plane 115 when antenna 1200 is operated as a radio antenna. In particular, support substrate 930 is identical to support substrate 930 shown in FIG. 9. It is made of dielectric material and provides mechanical support for monopole 110 and transmission line 130 in a manner similar to ground plane 115; and flat magnetic coil with slotted center patch 1100 behaves as a metal sheet at the radio frequency of operation of the antenna, much like ground plane 115 in FIG. 1. In some embodiments of the present invention there is an electrical connection between one conductor of transmission line 130 and flat magnetic coil with slotted center patch 1100, as needed, to help flat magnetic coil with slotted center patch 1100 behave like ground plane 115.

The comments that were made in conjunction with FIG. 9 regarding monopole antenna 900 also apply for monopole antenna 1200, except that the impairment due to the area where there are no loops is greatly ameliorated thanks to the slotted center patch.

In FIGS. 9 and 12, no load elements are shown explicitly. Of course, load elements of some type are needed to make meaningful use of the antennas. For example, a load element in the form of a radio transmitter-receiver unit might be connected to input-output port 140 for using the antenna as a radio antenna, and a small load element similar to load element 720 might be connected to the ends of the flat magnetic coil. However, although load element 720 is depicted as a small device, smaller than the coil, and input-output port 140 is depicted as a connector on a transmission line, as might be used to connect the antenna to a rack-sized radio system, it will be clear to those skilled in the art, after reading this disclosure, how to make and use embodiments of the present invention wherein the load elements attached to the coil's input-output port, or to the radio input-output port 140, are of any size and shape and are connected to their respective input-output ports via a variety of means, comprising, for example and without limitation, a direct connection, or a connection via a wire pair, or a connection via a transmission line suitable for the type of electrical signals involved and for the type of input-output port being used.

Figure 13:
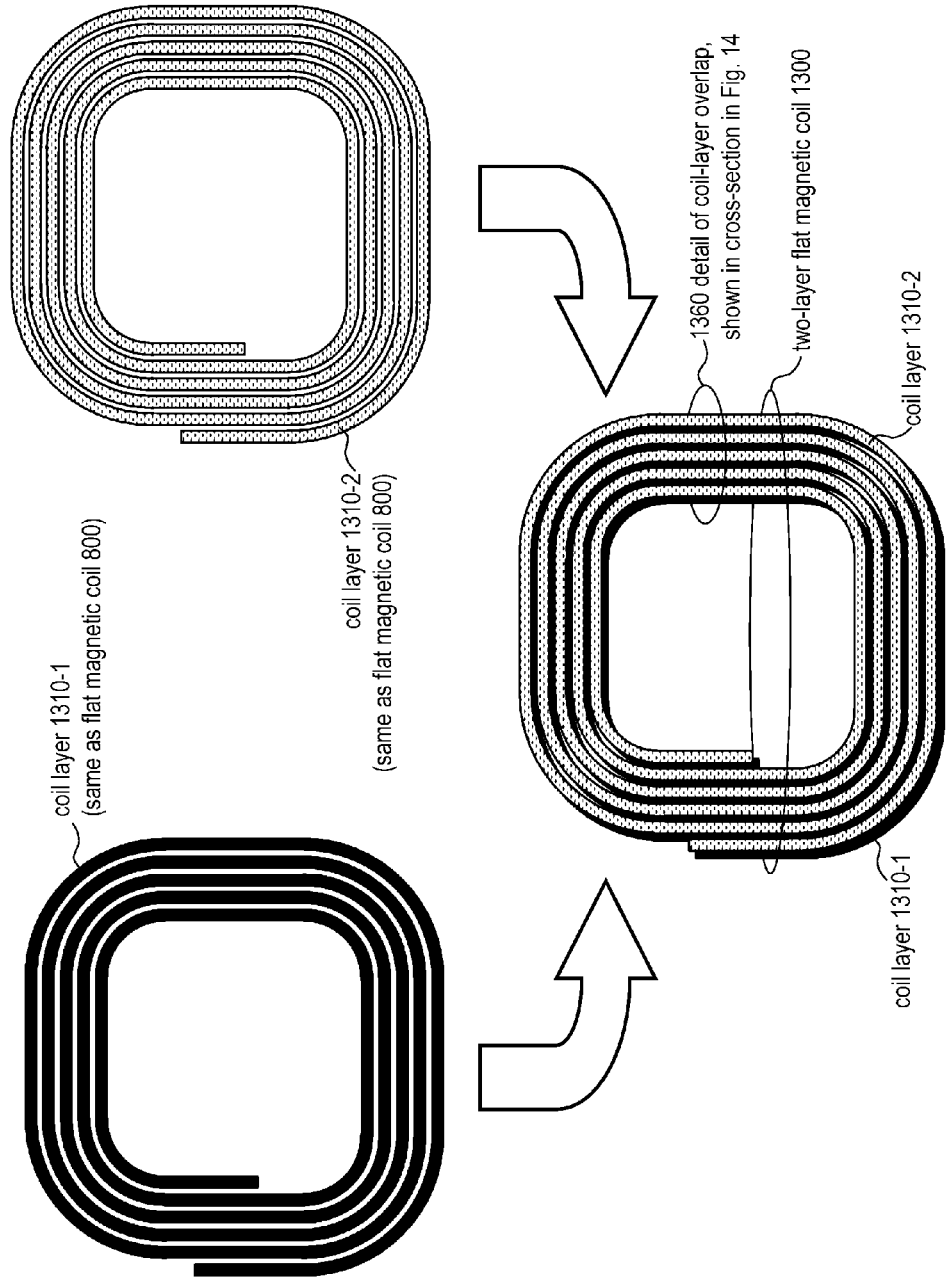
FIG. 13 depicts a first dual-layer flat magnetic coil and a method for making it.

FIG. 13 depicts dual-layer flat magnetic coil 1300 and a method for making it. It is well known in the art that the use of multiple layers can provide coils with enhanced effectiveness because the resulting coil has more loops than a single-layer coil. Multi-layer coils can be made by combining multiple instances of single-layer coils; for example, two single-layer coils, each identical to flat magnetic coil 800, can be stacked on top of one another to form a dual-layer coil. It is well known in the art that an insulating layer must be present between the two coils and that the two coils can be connected in series. However, in the prior art, it is customary to stack the coils such that the loops of one coil overlap exactly the loops of the other coil. This is shown for example, in FIGS. 4 and 6 of US Patent Application Publication 2011/0057629 A1.

Embodiments of the present invention can use dual-layer flat magnetic coil 1300, wherein, in contrast to the prior art, the two coil layers are stacked such that coil loops in one layer are in a shifted position, relative to coil loops in the other layer. This is illustrated in FIG. 13, where coil layers 1310-1 and 1310-2 are both identical to flat magnetic coil 800 and, therefore, are identical to one another. To form dual-layer flat magnetic coil 1300, the two coil layers are stacked on top of one another, but not exactly aligned with one another, as in the prior art. Instead, one coil layer is shifted in position, with respect to the other coil layer, such that the loops of one coil layer overlap, for the most part, the gaps between loops in the other coil layer. This is illustrated in the lower half of FIG. 13.

Figure 14:
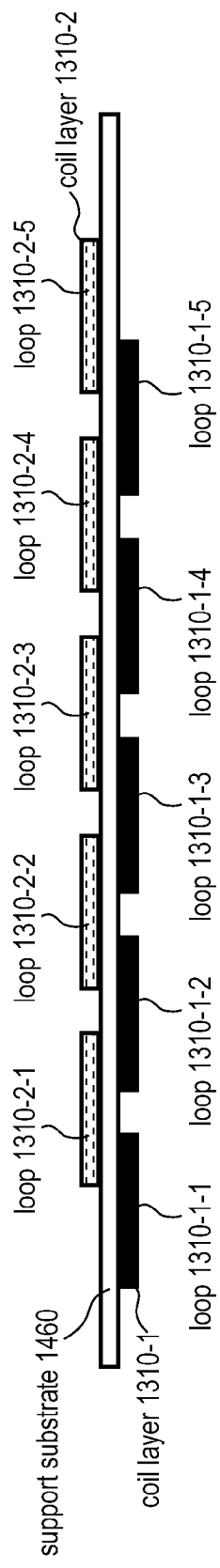
FIG. 14 shows, in cross section, a magnified view of a portion of FIG. 13.

FIG. 14 shows, in cross section, a magnified view of the area identified as 1360 in FIG. 13. In the figure, the five rectangles labeled 1310-1-1 through 1310-1-5 represent the five loops of coil layer 1310-1 viewed in cross section, and the five rectangles labeled 1310-2-1 through 1310-2-5 represent the five loops of coil layer 1310-2 viewed in cross section. FIG. 14 explicitly shows support substrate 1460, which is not shown explicitly in FIG. 13. Support substrate 1460 provides physical support for the two coil layers and can be made of a dielectric material to also provide electrical insulation between the two coil layers. FIG. 14 shows how the loops of coil layer 1310-1 overlap the gaps between the loops of coil layer 1310-2, and vice versa.

The fact that the loops of one layer overlap the gaps in the other layer enhances the capacitance between adjacent loops and, thereby, makes it easier for dual-layer flat magnetic coil 1300 to behave as an uninterrupted sheet of conductive material at high frequencies.

The fact that the two layers are identical makes it impossible for the loops of one layer to overlap the gaps of the other layer everywhere. Accordingly, it can be seen in FIG. 13 that, in some spots, the loops of one layer do not overlap the gaps of the other layer. However, the desired type of overlap does occur over a large fraction of the coil surfaces, and this provides a significant improvement in the behavior of the dual-layer coil as an uninterrupted sheet of conductive material, compared to a single-layer flat magnetic coil such as flat magnetic coil 800.

It can be advantageous to make a multi-layer flat magnetic coil out of identical layers; however, if is acceptable to have layers that are not identical, it is possible to make a multi-layer magnetic coil wherein the loops of one layer overlap of the gaps of an adjacent layer over the entire surface of the coil. This is illustrated in the next figure.

Figure 15:
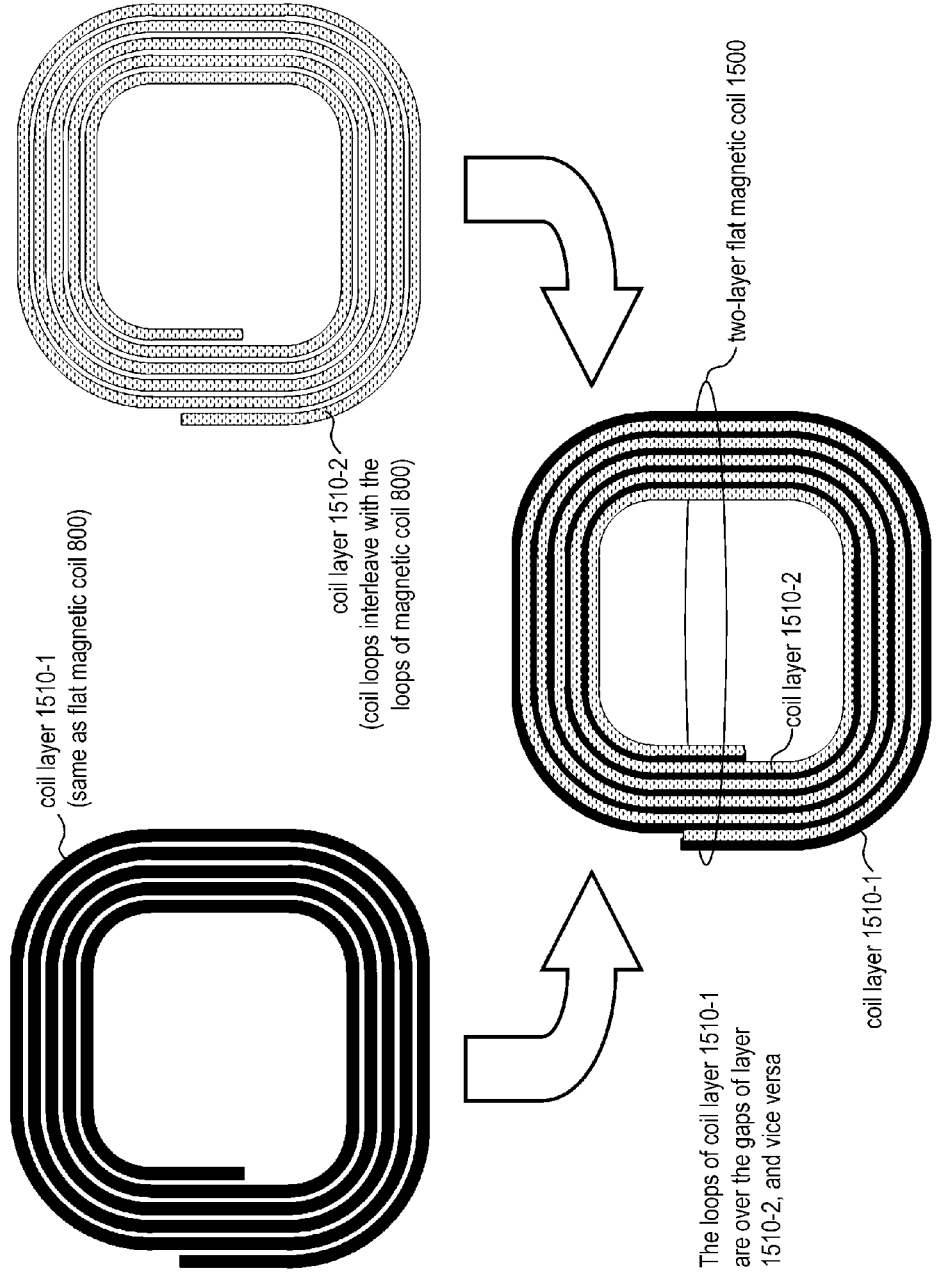
FIG. 15 depicts a second dual-layer flat magnetic coil and a method for making it.

FIG. 15 depicts dual-layer flat magnetic coil 1500 and a method for making it. Embodiments of the present invention can use dual-layer flat magnetic coil 1500, wherein, in contrast to the prior art, the two coil layers are stacked such that coil loops in one layer overlap everywhere gaps between loops in the other layer. In FIG. 15, coil layer 1510-1 is identical to flat magnetic coil 800, while coil layer 1510-2 is slightly different. In particular, the loops of coil layer 1510-2 follow the pattern of the gaps between loops of coil layer 1510-1. Therefore, it is possible to overlap coil layer 1510-2 on top of coil layer 1510-1 in a position, relative to coil layer 1510-1, such that the loops of coil layer 1510-2 fall exactly on top of the gaps between the loops of coil layer 1510-1 everywhere.

Although FIG. 13 depicts two identical coils, and FIG. 15 depicts two coils wherein one coil traces the gaps between loops of the other coil, it will be clear to those skilled in the art, after reading this disclosure, how to make and use embodiments of the present invention wherein the shapes of two or more coils are different from one another and different from the depictions of FIGS. 13-15, but which, when the coils are properly stacked, result in a dual-layer or a multi-layer flat magnetic coil wherein the behavior of the coil as an uninterrupted sheet of conductive material is enhanced.

The comments that were made in conjunction with FIG. 13 regarding dual-layer flat magnetic coil 1300 also apply for dual-layer flat magnetic coil 1500, except that there is no portion of the surface of dual-layer flat magnetic coil 1500 where gaps in one layer are not overlapped by loops in the other layer.

Figure 16:
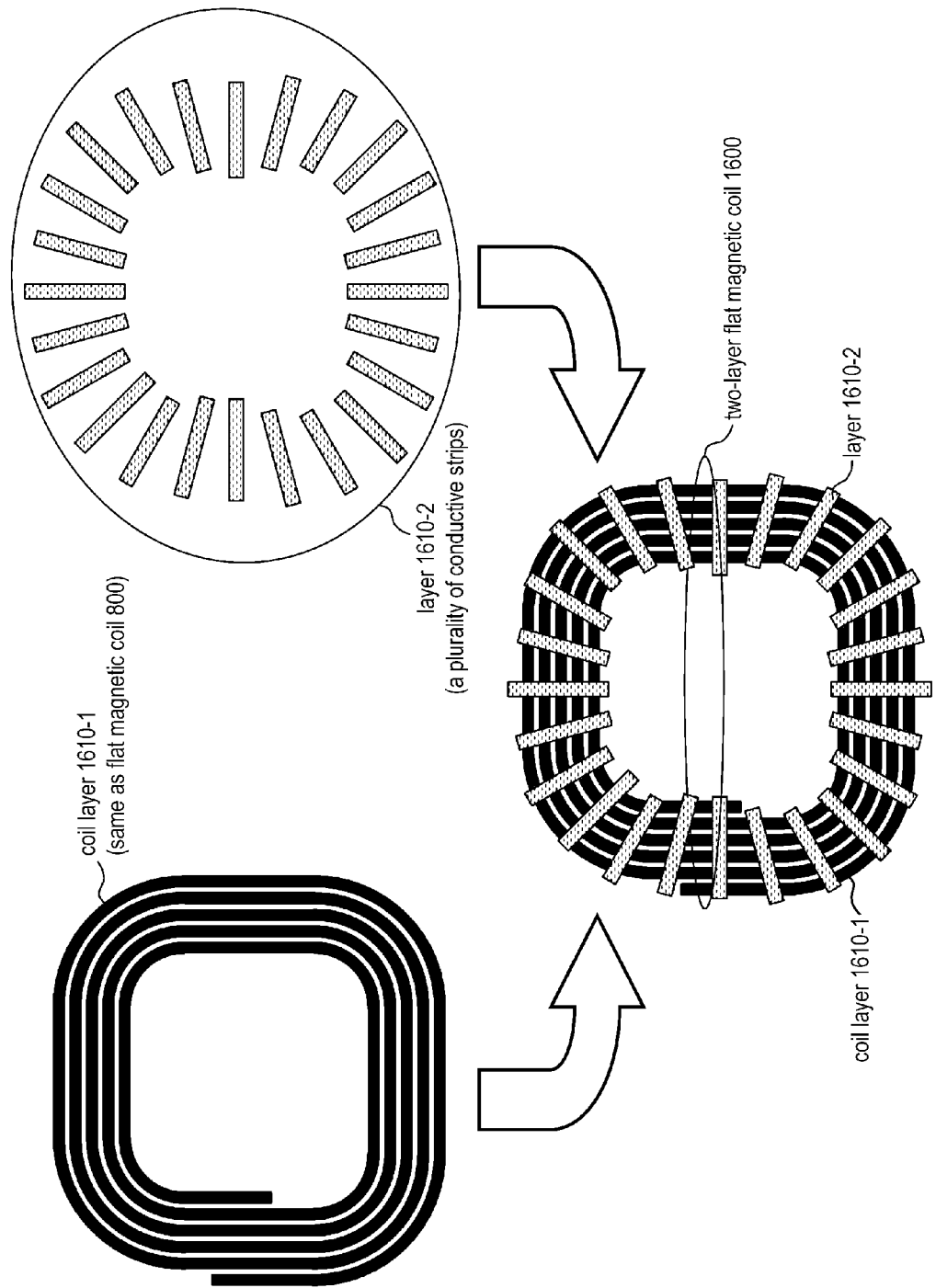
FIG. 16 depicts a dual-layer flat magnetic coil wherein only one layer comprises a magnetic coil, and a method for making it.

FIG. 16 depicts dual-layer flat magnetic coil 1600 and a method for making it. In some embodiments of the present invention, it might be desirable to enhance the capacitance between adjacent coil loops without adding additional loops in a second layer. Such embodiments can make use of dual-layer flat magnetic coil 1600, wherein coil layer 1610-1 is identical to flat magnetic coil 800, but the other layer, depicted by layer 1610-2, is not a magnetic coil. Instead, layer 1610-2 comprises a plurality of conductive strips, arranged as shown in the figure, wherein each strip straddles multiple loops of coil layer 1610-1, when the two layers are overlapped as shown in the lower half of FIG. 16. The physical arrangement of conductive strips in layer 1610-2 achieves a significant increase in the capacitance between adjacent loops of coil layer 1610-1.

Although FIG. 16 depicts layer 1610-2 as a plurality of conductive strips arranged such that they straddle multiple loops of coil layer 1610-1, it will be clear to those skilled in the art, after reading this disclosure, how to make and use embodiments of the present invention wherein the capacitance of coil layer 1610-1 is enhanced by adding a second layer with a pattern of conductive material other than a plurality of conductive strips. In general, any pattern of conductive material wherein one or more patches of conductive material, whether or not in the shape of strips, overlap multiple coil loops, will achieve an enhancement in the capacitance between coil loops. Hereinafter, the word "strip" will be used to refer to a patch of conductive material that overlaps multiple coil loops, regardless of whether or not its shape is actually a strip. It will be clear to those skilled in the art, after reading this disclosure, how to make and use embodiments of the present invention that comprise a multi-layer magnetic coil wherein one layer enhances the capacitance between loops of another layer.

Although FIGS. 13-16 depict multi-layer magnetic coils wherein one or more layers are the same as flat magnetic coil 800. it will be clear to those skilled in the art, after reading this disclosure, how to make and use embodiments of the present invention wherein one or more layers comprise a center patch as depicted in FIG. 10 or as depicted in FIG. 11. In this specification, wherever a coil like flat magnetic coil 800 is depicted or indicated as part of an embodiment of the present invention, it will be clear to those skilled in the art, after reading this disclosure, that alternative embodiments of the present invention are possible wherein such coil is replaced by a coil similar to any one of the flat magnetic coils described in this disclosure, and that such coil can have a single layer or any number of layers.

It will be clear to those skilled in the art, after reading this disclosure, how to make and use embodiments of the present invention that comprise a multi-layer flat magnetic coil wherein the loops of one coil overlap the gaps between loops of another coil over a large portion of those gaps, such that the capacitance between adjacent loops is substantially increased, through other methods and with other coil patterns besides the methods and patterns illustrated in FIGS. 13-16. Hereinafter, the loops of one coil will be said to be "in a shifted position", relative to the loops of another coil, when such loops overlap gaps between loops of the other coil over a large portion of those gaps, such that the capacitance between adjacent loops is substantially increased, through the methods and patterns illustrated in FIGS. 13-16, or through other methods and patterns that achieve that result.

Figure 17:
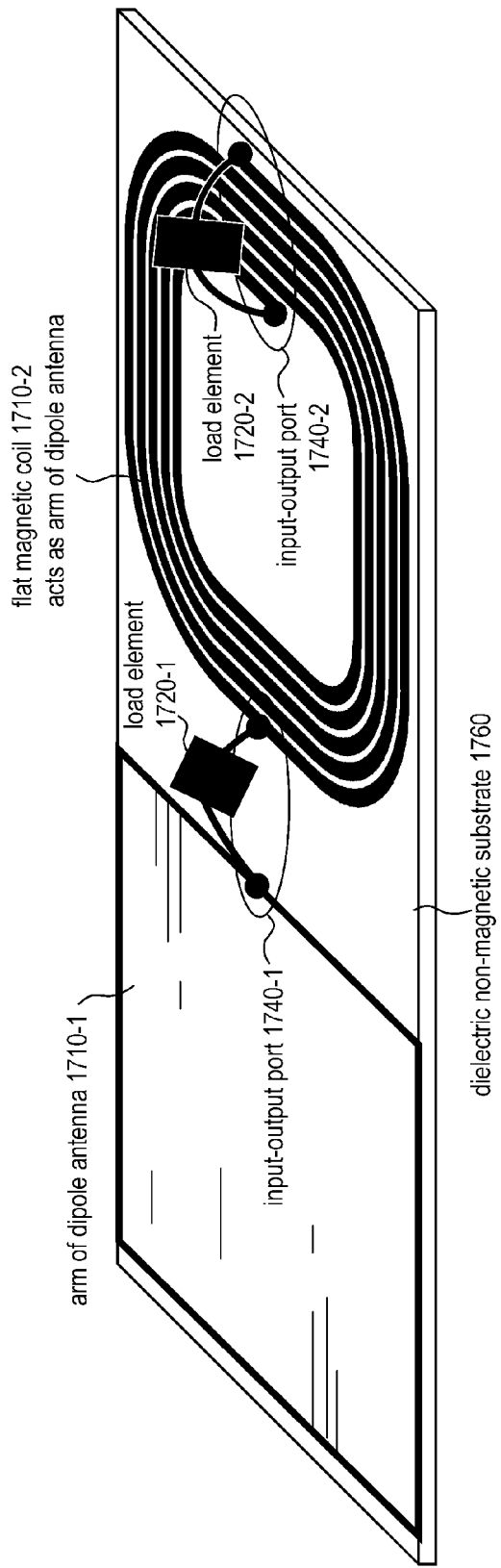
FIG. 17 depicts an RFID device with a dual-band antenna comprising a flat magnetic coil in accordance with an alternative embodiment of the present invention.

FIG. 17 depicts RFID device 1700 in accordance with an alternative embodiment of the present invention. RFID device 1700 comprises a dual-band antenna derived from the dipole radio antenna depicted in FIG. 3. RFID device 1700 is derived from RFID device 300 in that, compared to FIG. 3, arm of dipole antenna 310-2 has been replaced by flat magnetic coil 1710-2. Much like monopole antennas 900 and 1200, this antenna is effective as a magnetic antenna at one frequency of operation, and as a radio antenna at another, higher, frequency of operation. It is called a dual-band antenna because, as is true of any antenna, there is a range of frequencies around each of the two frequencies of operation where the antenna can achieve efficient operation. It is customary in the art to refer to such ranges of efficient operation as "bands". Monopole antennas 900 and 1200 can, therefore, also be referred to as dual-band antennas.

In RFID device 1700, the dual-band antenna comprises separate input-output ports for the two bands of operation. In particular, input-output port 1740-1 is for operation as a radio antenna, and input-output port 1740-2 is for operation as a magnetic antenna. Accordingly, RFID device 1700 comprises two separate load elements, depicted as load element 1720-1 and load element 1720-2, respectively, for the two bands of operation.

RFID device 1700 also comprises dielectric non-magnetic substrate 1760 which provides mechanical support for the entire device. It is similar to support substrate 360, but it is non-magnetic so as not to cause impairment of antenna operation as a magnetic antenna.

In some embodiments of the present invention, operation of the antenna as a radio antenna might be at frequencies in the so-called Ultra-High-Frequency (UHF) range, and operation as a magnetic antenna might be at frequencies in the so-called Low-Frequency (LF) range. In such embodiments, load element 1720-1 might be made identical to load element 320 as would be used in an implementation of RFID device 300 for use in the UHF band; and load element 1720-2 might be made identical to load element 720 as would be used in an implementation of RFID device 700 for use in the LF band. This is because, in RFID device 1700, the behavior of load element 1720-1 in the LF band does not impact the operation of flat magnetic coil 1710-2 in the LF band, and the behavior of load element 1720-2 in the UHF band does not impact the operation of the dipole antenna in the UHF band. However, it might be desirable to make load element 1720-2 small, compared to the size of flat magnetic coil 1710-2, to insure that the behavior of the dipole antenna of RFID device 1700 is not too different from the behavior of the dipole antenna of RFID device 300, in the UHF range.

Figure 18:
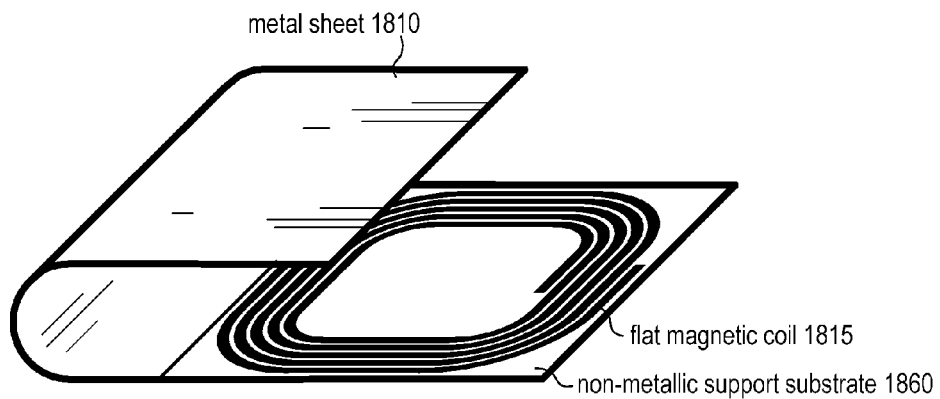
FIG. 18 depicts a resonant antenna with a flat magnetic coil replacing part of the metal sheet in accordance with an alternative embodiment of the present invention.

FIG. 18 depicts resonant antenna 1800 in accordance with an alternative embodiment of the present invention. Resonant antenna 1800 is derived from the resonant radio antenna depicted in FIG. 2 as antenna 210 made out of a metal sheet. Compared to antenna 210, resonant antenna 1800 is made out of a smaller metal sheet, depicted as metal sheet 1810, because part of the metal sheet has been replaced by flat magnetic coil 1815. The flat magnetic coil is supported by non-metallic support substrate 1860, which keeps flat magnetic coil 1815 in such a position that its surface follows the shape of the part of the metal sheet that it replaces.

Resonant antenna 1800 is a dual-band antenna. It can operate as a radio antenna in a band of frequencies high enough that flat magnetic coil 1815 behaves as an uninterrupted sheet of conductive material. At such frequencies, its behavior is similar to that of antenna 210 because the shape of flat magnetic coil 1815 is similar to the shape of the part of metal sheet that it replaces. In a lower band of frequencies, flat magnetic coil 1815 is an efficient magnetic antenna and, thereby, provides the desired functionality of resonant antenna 1800 as a magnetic antenna. It will be clear to those skilled in the art, after reading this disclosure, how to place input-output ports and load elements to achieve the desired dual-band operation with resonant antenna 1800.

Figure 4:
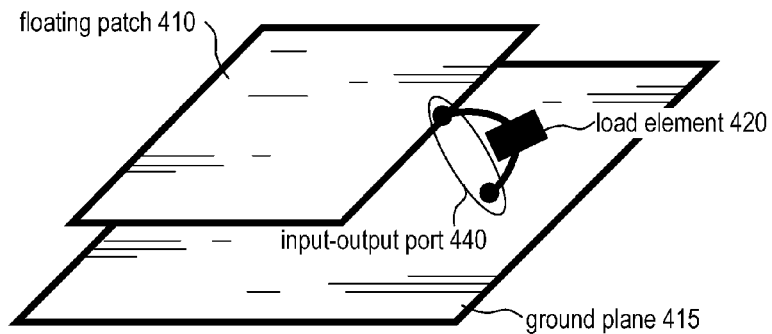
FIG. 4 depicts an RFID device with a patch antenna made out of two metal sheets in the prior art.
Figure 5:
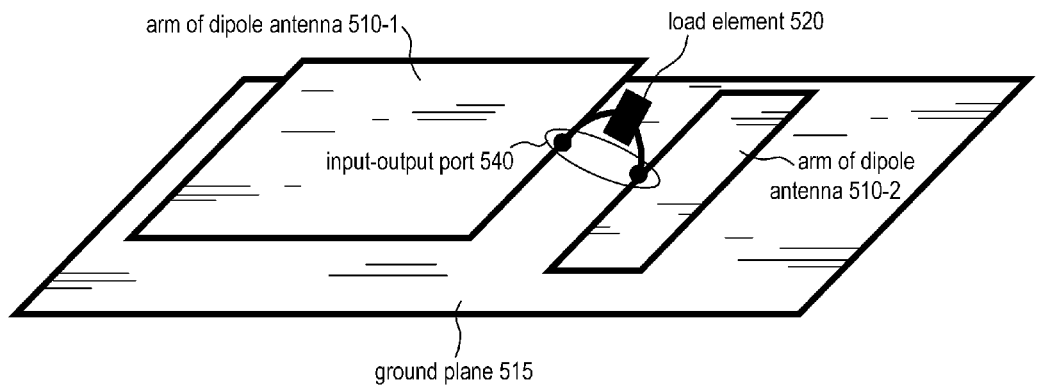
FIG. 5 depicts an RFID device with an asymmetric dipole antenna and a ground plane, all made out of metal sheets, in the prior art.
Figure 6:
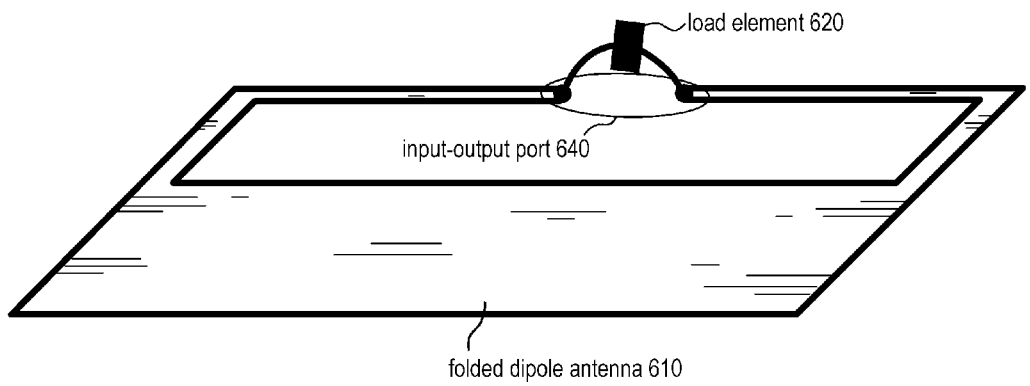
FIG. 6 depicts an RFID device with a folded dipole antenna made out of a metal sheet in the prior art.
Figure 7:
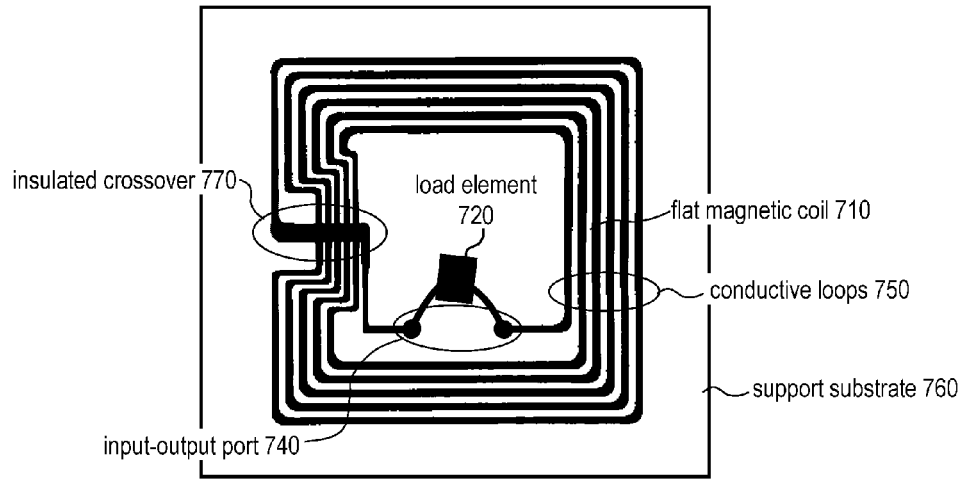
FIG. 7 depicts an RFID device with a flat magnetic coil for antenna in the prior art. The device 700 has a planar structure.
Figure 19:
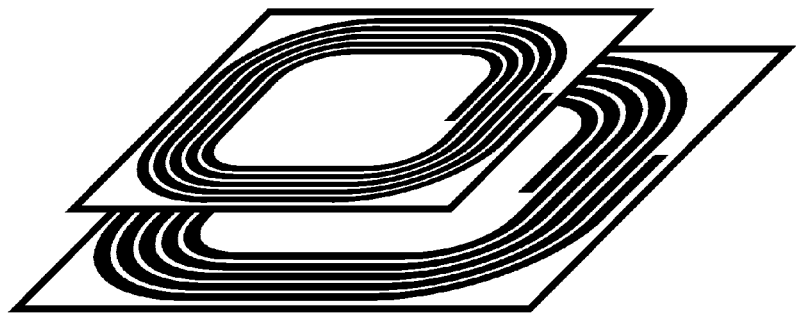
FIG. 19 depicts a patch antenna with flat magnetic coil replacing both metal sheets in accordance with an alternative embodiment of the present invention.

FIG. 19 depicts patch antenna 1900 in accordance with an alternative embodiment of the present invention. Patch antenna 1900 is derived from the patch antenna depicted in FIG. 4. In FIG. 4, both floating patch 410 and ground plane 415 are metal sheets; here, both metal sheets have been replaced by flat magnetic coils with the same size and shape as the metal sheets that they replace. The comments that were made in previous paragraphs regarding dual-band operation of other embodiments of the present invention also apply for patch antenna 1900. Furthermore, because this antenna has two coils, the two coils can be operated as independent coils, each one with its own load element, or they can be connected in series.

Figure 20A:
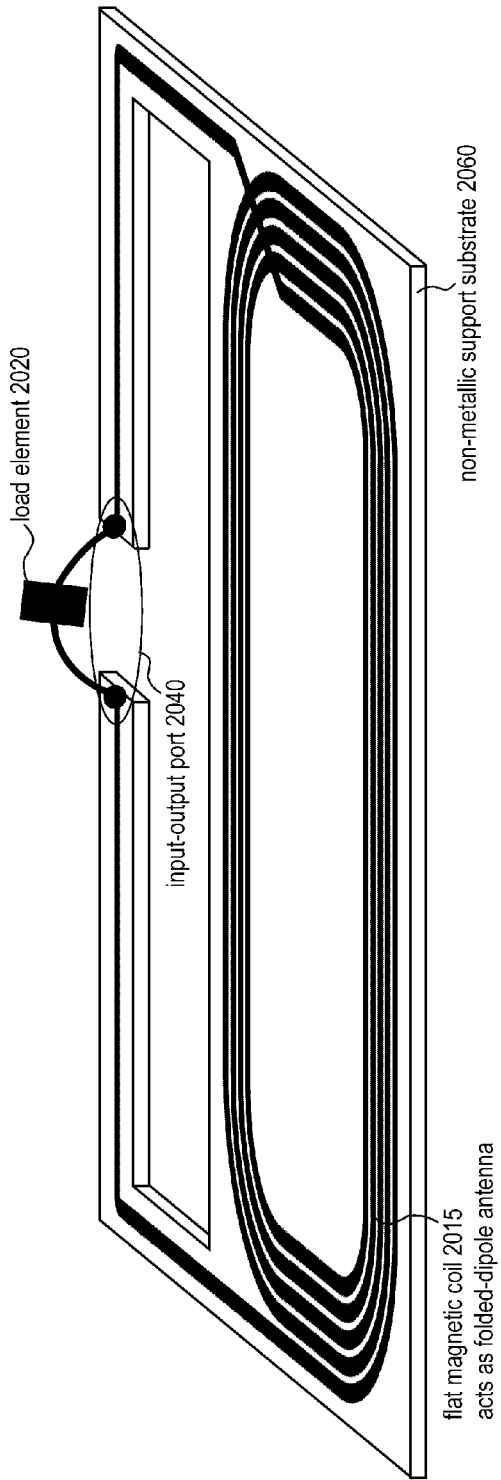
FIG. 20a depicts an RFID device with a dual-band antenna comprising a flat magnetic coil in accordance with an alternative embodiment of the present invention.

FIG. 20a depicts RFID device 2000 in accordance with an alternative embodiment of the present invention. RFID device 2000 comprises a dual-band antenna derived from the folded dipole radio antenna depicted in FIG. 6. Compared to FIG. 6, the entire metal sheet of the folded dipole antenna has been replaced by flat magnetic coil 2015 which has the same shape and size as the metal sheet that it replaces. Flat magnetic coil 2015 is mechanically supported by non-metallic support substrate 2060. The comments that were made in previous paragraphs regarding dual-band operation of other embodiments of the present invention also apply for RFID device 2000.

FIG. 20a explicitly shows input-output port 2040 and load element 2020. Because of its shape, it is natural for this dual-band antenna based on the folded-dipole antenna of FIG. 6 to have a single input-output port operable for both bands of operation, as shown in FIG. 20a. Accordingly, load element 2020 processes electrical signals generated by the antenna both when it operates as a radio antenna and when it operates as a magnetic antenna. Indeed, both modes of operation can occur simultaneously.

Although not explicitly noted, in most embodiments of the present invention, two alternatives are possible for how input-output ports are operable: (i) an input-output port might be only operable when the antenna is used as a radio antenna, or only operable when the antenna is used as a magnetic antenna; or (ii) an input-output port might be operable both when the antenna is used as a radio antenna and when the antenna is used as a magnetic antenna. Furthermore, an input-output port might be operable in multiple bands with either mode of antenna use. It will be clear to those skilled in the art, after reading this disclosure, how to interconnect flat magnetic coils and input-output ports as needed to achieve a desired combination of input-output ports that are operable for one antenna mode or for the other antenna mode, or for both.

Figure 20B:
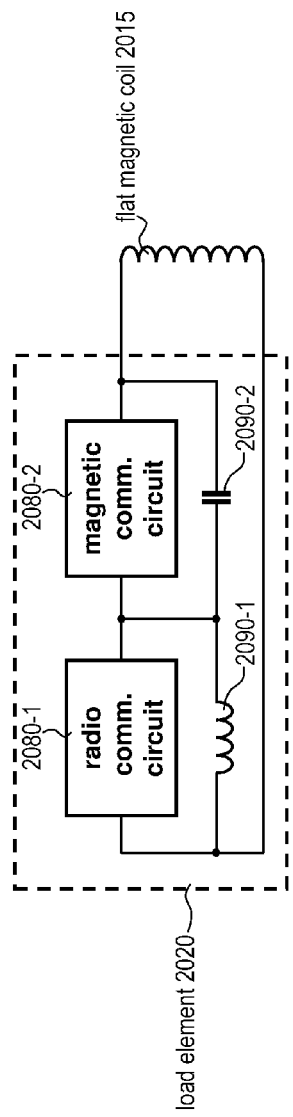
FIG. 20b depicts an RFID device with a dual-band antenna comprising a flat magnetic coil in accordance with an alternative embodiment of the present invention.

FIG. 20b shows a simplified circuit diagram for RFID device 2000. The figure shows explicitly some of the circuitry of load element 2020. The load element might comprise other circuitry that is not shown explicitly in FIG. 20b. Load element 2020 comprises radio communication circuit 2080-1 for processing electrical signals generated by the antenna when it operates as a radio antenna; and it comprises magnetic communication circuit 2080-2 for processing electrical signals generated by the antenna when it operates as a magnetic antenna. Both circuits can operate at the same time, thus enabling RFID device 2000 to communicate using radio signals and magnetic signals at the same time.

Figure 21A:
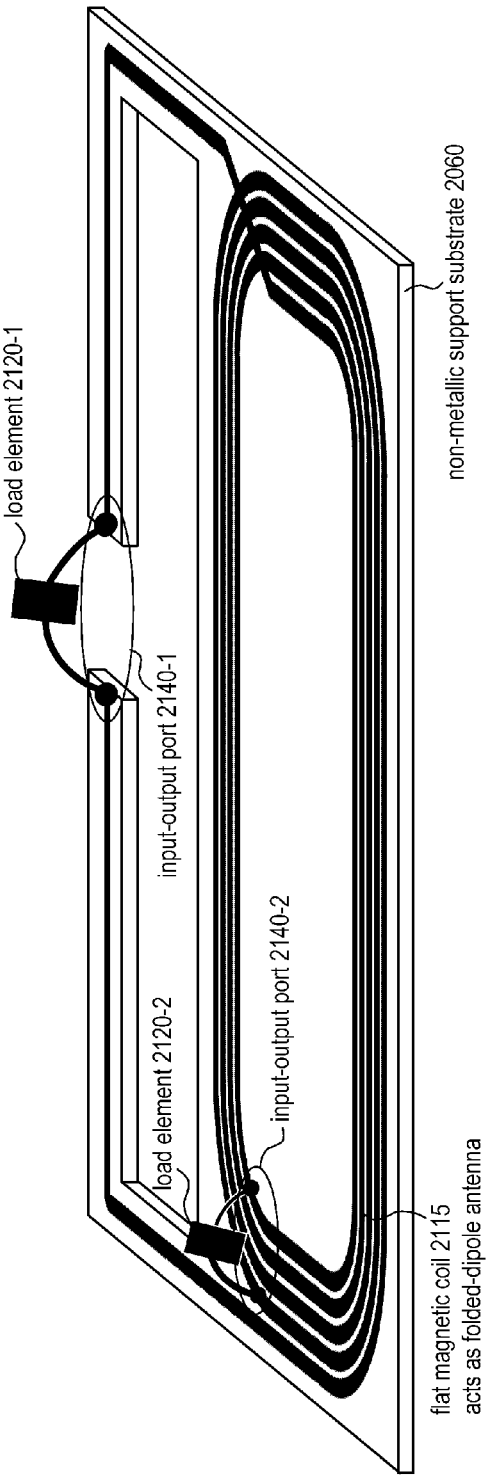
FIG. 21a depicts an RFID device with a triple-band antenna comprising a flat magnetic coil in accordance with an alternative embodiment of the present invention.

Load element 2020 also comprises inductor 2090-1 and capacitor 2090-2 interconnected as shown. Inductor 2090-1 presents a high impedance at the frequencies of operation of radio communication circuit 2080-1, but not at the frequencies of operation of magnetic communication circuit 2080-2, where it presents a low impedance. Conversely, capacitor 2090-2 presents a high impedance at the frequencies of operation magnetic communication circuit 2080-2, but not at the frequencies of operation of radio communication circuit 2080-1, where it presents a low impedance. It will be clear to those skilled in the art, after reading this disclosure, that the presence of inductor 2090-1 and capacitor 2090-2 enables each of radio communication circuit 2080-1 and magnetic communication circuit 2080-2 to process its respective electrical signal without impairing each other's operation. A circuit that accomplishes this result, such as the circuit that comprises inductor 2090-1 and capacitor 2090-2, is known in the art as a diplexer FIG. 21a depicts RFID device 2100 in accordance with an alternative embodiment of the present invention. RFID device 2100 comprises a triple-band antenna derived from the folded dipole radio antenna depicted in FIG. 6. RFID device 2100 is similar to RFID device 2000, but with the addition of a second input-output port and a second load element. In particular, input-output port 2140-1 and load element 2120-1 are similar to their counterparts in RFID device 2000 in that load element 2120-1 processes electrical signals generated by the antenna at input-output port 2140-1 both when the antenna operates as a radio antenna and when it operates as a magnetic antenna. However, the additional input-output port 2140-2 feeds an electrical signal to load element 2120-2 that is also generated through antenna operation as a magnetic antenna. Additional details of the modes of operation of RFID device 2100 are discussed in conjunction with FIG. 21b.

Figure 21B:
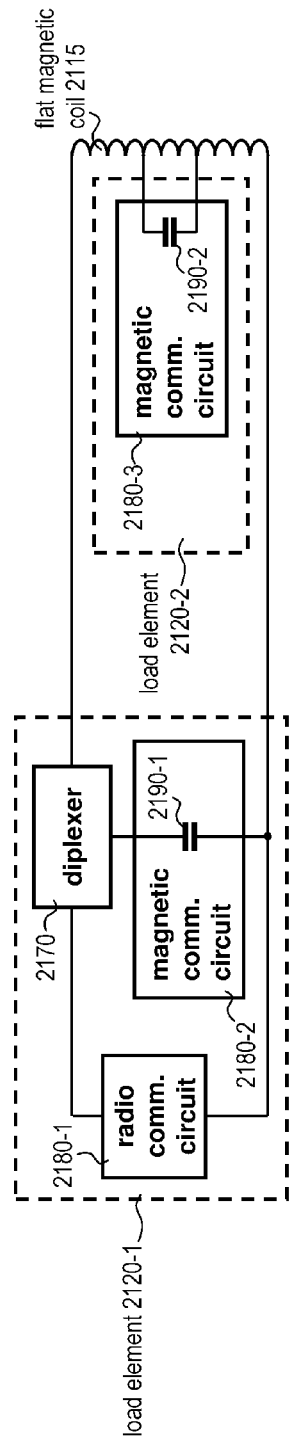

FIG. 21b shows a simplified circuit diagram for RFID device 2100. The figure shows explicitly some of the circuitry of load elements 2120-1 and 2120-2. Both load elements might comprise other circuitry that is not shown explicitly in FIG. 21b. Load element 2120-2 is connected, as shown in FIG. 21a, across a subset of the loops of flat magnetic coil 2115. Load element 2120-2 comprises magnetic communication circuit 2180-3 which comprises capacitor 2190-2. This capacitor, in conjunction with the subset of loops of the flat magnetic coil, forms a resonant circuit of the so-called "LC" type. The frequency of resonance of this resonant circuit is a function of the capacitance of the capacitor and of the inductance of the subset of loops.

Load element 2120-1 comprises magnetic communication circuit 2180-2 which comprises capacitor 2190-1. This capacitor is connected across the full set of loops of flat magnetic coil 2115 through diplexer 2170. This connection forms a second resonant circuit of the LC type. The frequency of resonance of this second resonant circuit is a function of the capacitance of capacitor 2190-1 and of the inductance of the full set of loops. The capacitances of the two capacitors are chosen such that the two frequencies of resonance are different.

The function of diplexer 2170 is to provide a connection between magnetic communication circuit 2180-2 and flat magnetic coil 2115 at the frequency of resonance of the second resonant circuit, but not at the frequency at which the antenna operates as a radio antenna. At this radio frequency of operation, the diplexer connects flat magnetic coil 2115 to radio communication circuit 2180-1. At this frequency, flat magnetic coil 2115 behaves as an uninterrupted sheet of conductive material, and the antenna behaves like the folded dipole radio antenna of FIG. 6. Radio communication circuit 2180-1 can process an electrical signal generated by the antenna operating as a radio antenna, or it can generate an electrical signal that the antenna converts into a transmitted radio signal, or both.

The antenna of RFID device 2100 is a triple-band antenna because it can operate as a radio antenna at a radio band through radio communication circuit 2180-1, or it can operate as a magnetic antenna at a frequency band around the frequency of resonance of the resonant circuit formed by capacitor 2190-1, or it can operate as a magnetic antenna at a frequency band around the frequency of resonance of the resonant circuit formed by capacitor 2190-2.

In some embodiments of the present invention, operation of a triple band antenna such as the antenna of RFID device 2100 might be at radio frequencies in the UHF range, as a radio antenna; operation as a magnetic antenna might be at frequencies in the LF range, near the frequency of resonance of the resonant circuit formed by capacitor 2190-1; and operation as a magnetic antenna might also be at frequencies in the so-called High-Frequency (HF) range, near the frequency of resonance of the resonant circuit formed by capacitor 2190-2.

It is well known in the art how to make radio antennas that operate at more than one radio band of operation. Indeed, some of the prior-art radio antennas of FIGS. 1-6 are well suited for operation as multi-band radio antennas. It will be clear to those skilled in the art, after reading this disclosure, how to make and use embodiments of the present invention that comprise an antenna capable of operating as a radio antenna in one or more radio bands, and also capable of operating as a magnetic antenna in one or more bands suitable for magnetically-coupled communications.

Figure 22:
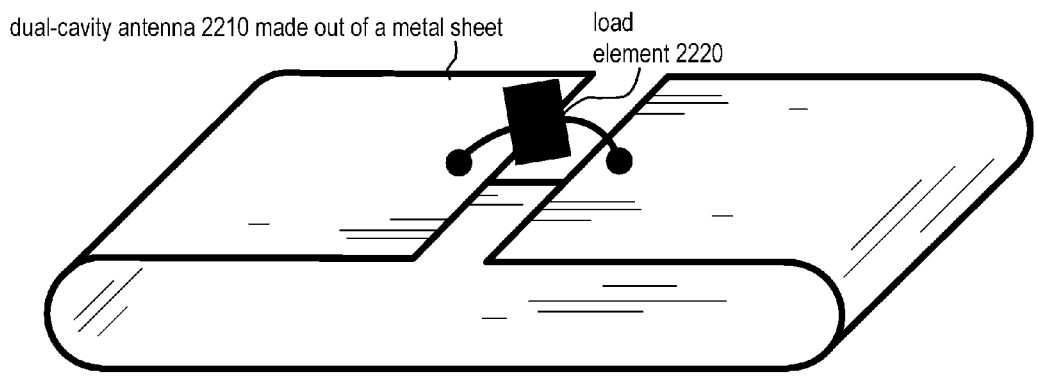
FIG. 22 depicts an RFID device with a dual-cavity radio antenna made out of a metal sheet.

FIG. 22 depicts RFID device 2200 with a dual-cavity radio antenna made out of a metal sheet. The antenna of the device is dual-cavity antenna 2210 which is made out of a metal sheet shaped as shown in the figure. This device operates only in a radio band and, accordingly, load element 2220 comprises a radio communication circuit but not a circuit for magnetic-antenna operation.

Figure 23:
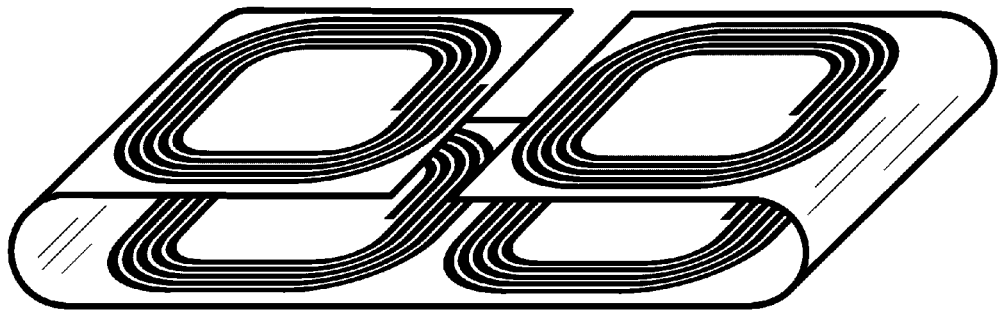
FIG. 23 depicts a dual-cavity antenna with flat magnetic coils replacing parts of the metal sheet in accordance with an alternative embodiment of the present invention.

FIG. 23 depicts dual-cavity antenna 2300 in accordance with an alternative embodiment of the present invention. Dual-cavity antenna 2300 is derived from the dual-cavity radio antenna of FIG. 22 which is made out of a metal sheet. FIG. 23 shows how parts of the metal sheet can be replaced by flat magnetic coils.

Some of the figures of this disclosure depict embodiments of the present invention that comprise multiple load elements. Such load elements are often depicted with no interconnections between them. However, it will be clear to those skilled in the art how to make and use embodiments of the present invention wherein load elements are mutually interconnected, or where different parts of a load element are mutually interconnected. For example, and without limitation, such interconnections might be used for different load elements to share memory or other functionalities, such that an RFID device might take advantage of information collected while operating in a radio band and use that information while operating in a magnetically-coupled communication band, or vice versa. Also, for example, and without limitation, an RFID device might use its antenna as a magnetic antenna to collect energy from a magnetic field, and use that energy for power supply for a load element that supports antenna operation in a radio band, or vice versa.

Embodiments of the present invention are particularly advantageous in applications where both magnetically-coupled communications and radio communications are needed. For example, RFID tags for identification of livestock, also known as electronic ear tags for cattle, conform to various international standards, some of which are based on radio communications in the UHF range, while others are based on magnetically-coupled communications in the LF range. Embodiments of the present invention can be advantageously used for achieving electronic ear tags that conform to multiple standards in a small form factor. In such tags, a multi-band antenna in accordance with the present invention can be accommodated inside a housing suitable for attaching to an animal. Such an antenna can conform to both a UHF-based standard and an LF-based standard without requiring a housing of excessively large size.

In some applications, it is desirable to have a wireless device with the size and shape of a conventional credit card. It is advantageous, for such a device, to be capable of both radio communications and magnetically-coupled communications. A dual-band antenna in accordance with the present invention makes it easier to efficiently implement both types of communications in such a wireless device.

It is to be understood that this disclosure teaches just one or more examples of one or more illustrative embodiments, and that many variations of the invention can easily be devised by those skilled in the art after reading this disclosure, and that the scope of the present invention is to be determined by the claims accompanying this disclosure.

Markman Definitions

Antenna—For the purposes of this specification, an "antenna" is defined as a passive device for coupling energy into or out of a particular type of wireless signal. A "radio antenna" is for coupling energy into or out of a radio signal. A "magnetic antenna" is for coupling energy into or out of a magnetic signal.

An antenna that is used for coupling energy into a signal is commonly referred to as a "transmitting" antenna, and an antenna that is used for coupling energy out of a signal is commonly referred to as a "receiving" antenna; however, antennas are, intrinsically, reciprocal devices: a "transmitting" antenna can be used as a "receiving" antenna for the same type of signal that it can transmit, and vice versa. The adjectives "transmitting" and "receiving" are used in the art to identify how an antenna is being used, but they do not imply a physical or electrical specialization of the antenna for either function.

In a receiving antenna, the energy coupled out of a received wireless signal is converted into an electrical signal generated by the antenna. That electrical signal appears at an electric input-output port (sometimes implemented with a connector). In a transmitting antenna, an electrical signal is fed into the input-output port, and the antenna converts the energy of that electrical signal into energy that is coupled into a transmitted wireless signal.

Commonly, antennas have a single input-output port which is used for both transmission and reception. Alternatively, antennas might have multiple input-output ports and be capable of transmitting and/or receiving multiple wireless signals. Antennas can simultaneously receive and transmit wireless signals.

A radio antenna is typically made out of one or more pieces of metal suitably sized shaped and arranged. However, radio antennas might also comprise dielectric materials, in addition to metal. Electrically conductive materials other than metals are sometimes used. A magnetic antenna is typically made of out of one or more magnetic coils.

Based on—For the purposes of this specification, the phrase "based on" is defined as "being dependent on" in contrast to "being independent of". Being "based on" includes both functions and relations.

Coil—*The American Heritage Dictionary*, third edition, provides several definitions for the noun "coil". One of them, which is identified as being related to electricity, is: "A wound spiral of two or more turns of insulated wire, used to introduce inductance into a circuit". In this specification, the word "loop" is used instead of the word "turn" with the same meaning as in the above definition. Furthermore, for the purposes of this specification, the above definition is broadened as follows: (i) A loop might be made of any electrically conductive material, not just wire, in the shape of a loop. (ii) The electrically-conductive loops might or might not be electrically insulated, but they must be mutually insulated; i.e., there should not be an electrical path between one loop and another loop except at the ends of the loops, where loops might connect to other loops to form the spiral. (iii) The inductance of a coil is incidental. A coil might or might or might not be used for introducing inductance into a circuit. Indeed, in magnetically-coupled communications, coils are used not so much for introducing inductance into a circuit, but for coupling energy into or out of a magnetic field.

To Couple—In Physics, two systems are said to be "coupled" if they are interacting with each other. Accordingly, for the purposes of this specification, the infinitive "to couple" and its inflected forms (e.g., "coupling", "couples", "coupled", etc.) are used to denote a relationship between items whereby one item affects another, or vice versa, or both. In particular, coupling with a form of energy can mean any one of (i) extracting some or all of that energy; or (ii) augmenting that energy with additional energy; or (iii) creating energy of that form where none previously existed. Coupling can be direct or indirect. Indirect coupling occurs when one item affects another through one or more intermediate items.

Dielectric—In this specification, the word "dielectric" is used both as a noun and as an adjective to refer to a material that is electrically insulating (adjective) or an electrical insulator (noun).

Dual—*The American Heritage Dictionary*, third edition, provides several definitions for the adjective "dual". The second definition, which applies to this specification, is: "Having a double character or purpose". In this specification, the adjective "dual" is used as a prefix in hyphenated forms such as, for example, "dual-band", "dual-layer", or "dual-cavity". In accordance with the meaning given above, "dual-band" is used, for example, to refer to an antenna that has two distinct bands of operation; "dual-layer" is used, for example, to refer to a coil that has two distinct layers; and "dual-cavity" is used, for example, to refer to an antenna that has two distinct cavities.

Efficient—For the purposes of this specification, the adjective "efficient" and its inflected forms (e.g., "efficiently", "efficiency", etc.) are defined as denoting "adequacy at performing an assigned task". For example, an antenna that is part of a wireless system, and is used as a receiving antenna, is considered to be "efficient" if it couples sufficient energy out of a received signal to achieve the target signal-to-noise ratio for which the wireless system is designed, as long as the wireless system operates within the operating conditions for which it is specified.

Electrical circuit—*The American Heritage Dictionary*, third edition, provides several definitions for the noun "circuit". One of them is: "A configuration of electrically or electromagnetically connected components or devices". This is the definition to be used for "electrical circuit" for the purposes of this specification.

To Exhibit—For the purposes of this specification, the infinitive "to exhibit" and its inflected forms (e.g., "exhibiting", "exhibits", etc.) should be given the meaning "to manifest or make evident."

To Generate—For the purposes of this specification, the infinitive "to generate" and its inflected forms (e.g., "generating", "generation", etc.) should be given the ordinary and customary meaning that the terms would have to a person of ordinary skill in the art at the time of the invention.

Loop—*The American Heritage Dictionary*, third edition, provides several definitions for the noun "loop". The first definition is: "A length of line, thread, ribbon, or other thin material that is curved or doubled over making an opening". For the purposes of this specification, this definition is narrowed by requiring the "line, thread, ribbon, or other thin material" to be electrically conductive. A loop can be open or closed. A plurality of loops can be connected in series to form a coil.

Magnetic signal—For the purposes of this specification, a "magnetic signal" is defined as a signal consisting of a magnetic field that wirelessly couples two or more distinct devices through air or vacuum without needing a material support such as a wire, a connector, or a transmission line.

Multi—For the purposes of this specification, the prefix "multi" is used in hyphenated forms with the meaning "a plurality of". For example, the expression "multi-band antenna" is used to refer to an antenna that has a plurality of distinct bands of operation.

The meaning of "multi" comprises the meaning of the prefix "dual". Therefore, for example, a "multi-band antenna" is also a "dual-band antenna" in that it has at least two distinct bands and it can be used in applications where a dual-band antenna is needed simply by not using other bands of operation that might be available.

Radio-frequency identification (abbreviated as: RFID)—This expression is commonly used in the art to refer to a technique for tracking objects and/or storing and retrieving information about objects by means of wireless signals. The technique is typically implemented through the use of small communicators that are attached to the objects and are known as RFID tags. Even though the word "radio" appears in the expression, it is commonly used even in cases where the wireless signals are not radio signals. Indeed, for the purposes of this specification, this expression and its abbreviation (RFID) are used for systems that utilize radio communications, or magnetically-coupled communications, or both.

Radio signal—For the purposes of this specification, a "radio signal" is defined as a signal consisting of an electromagnetic wave that propagates through air or vacuum without needing a material support such as a wire, a connector, or a transmission line.

To Receive—For the purposes of this specification, the infinitive "to receive" and its inflected forms (e.g., "receiver", "receiving", "received", "reception", etc.) should be given the ordinary and customary meaning that the terms would have to a person of ordinary skill in the art at the time of the invention.

Sheet—*The American Heritage Dictionary*, third edition, provides several definitions for the noun "sheet". One of them is: "A broad, thin, usually rectangular mass or piece of material, . . . ". This is the definition to be used for the purposes of this specification; however, the noun should be understood to comprise nonrectangular shapes.

To Transmit—For the purposes of this specification, the infinitive "to transmit" and its inflected forms (e.g., "transmitter", "transmitting", "transmitted", "transmission", etc.) should be given the ordinary and customary meaning that the terms would have to a person of ordinary skill in the art at the time of the invention.

Triple—For the purposes of this specification, the adjective "triple" is given the same meaning as "dual", except that it refers to three entities instead of two. It is used, like "dual", as a prefix in hyphenated forms such as, for example, "triple-band". In accordance with the meaning given above, the first form is used, for example, to refer to an antenna that has three distinct bands of operation.

Because the quantity "three" is larger than "two", when the "triple" prefix is used, it comprises the meaning of the prefix "dual". For example, a "triple-band antenna" has three bands and, therefore, it is also a "dual-band antenna" in that it has two distinct bands and it can be used in applications where a dual-band antenna is needed simply by not using one of the three available bands of operation.

When—For the purposes of this specification, the word "when" is defined as "upon the occasion of."

What is claimed is:

1. A dual-frequency antenna comprising:
   a flat magnetic coil physically adapted for efficient antenna coupling with magnetically-coupled energy at a first frequency;
   wherein the shape of the coil is also physically adapted for efficient antenna coupling with electromagnetic energy at a second frequency;
   wherein the flat magnetic coil comprises multiple coil layers; and
   wherein coil loops in one coil layer are in a shifted position, relative to coil loops in an adjacent layer, such that the capacitance between adjacent coil loops is large enough to present a low impedance at the second frequency.

2. A dual-frequency antenna comprising:
   a flat magnetic coil physically adapted for efficient antenna coupling with magnetically-coupled energy at a first frequency;
   wherein the shape of the coil is also physically adapted for efficient antenna coupling with electromagnetic energy at a second frequency;
   wherein the flat magnetic coil comprises at least one coil layer, and at least one other layer that comprises a conductive strip; and wherein the conductive strip is physically arranged such that the conductive strip is capacitively coupled with a plurality of coil loops.

3. A method for making a dual-frequency antenna, the method comprising:
(i) designing an antenna for efficient coupling with electromagnetic energy at a first frequency, wherein the antenna design is based on one or more sheets of electrically conductive material;
(ii) replacing, in the antenna design, at least part of one of the one or more sheets with a flat magnetic coil; and
(iii) providing a first input-output port coupled with the magnetic energy at the first frequency, and a second input-output port coupled with the electromagnetic energy at the second frequency;
wherein the flat magnetic coil is designed with coil loops in one coil layer that are placed in a shifted position, relative to coil loops in an adjacent layer, such that the capacitance between adjacent coil loops is large enough to present a low impedance at the second frequency.

4. A method for making a dual-frequency antenna, the method comprising:
(i) designing an antenna for efficient coupling with electromagnetic energy at a first frequency, wherein the antenna design is based on one or more sheets of electrically conductive material; and
(ii) replacing, in the antenna design, at least part of one of the one or more sheets with a flat magnetic coil;
wherein the flat magnetic oil is designed so as to provide efficient coupling with magnetic energy at a second frequency;
wherein the flat magnetic coil is designed with at least one coil layer, and at least one other layer that comprises a conductive strip; and
wherein the conductive strip is physically arranged such that the conductive strip is capacitively coupled with a plurality of coil loops.

\* \* \* \* \*